(12) United States Patent
Inada

(10) Patent No.: US 10,267,991 B2
(45) Date of Patent: Apr. 23, 2019

(54) SEMICONDUCTOR DEVICE AND MANUFACTURING METHOD THEREOF

(71) Applicant: Renesas Electronics Corporation, Koutou-ku, Tokyo (JP)

(72) Inventor: Atsuro Inada, Ibaraki (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/871,569

(22) Filed: Jan. 15, 2018

(65) Prior Publication Data

US 2018/0136391 A1 May 17, 2018

Related U.S. Application Data

(62) Division of application No. 15/212,170, filed on Jul. 15, 2016, now Pat. No. 9,910,219.

(30) Foreign Application Priority Data

Aug. 5, 2015 (JP) ................. 2015-155195

(51) Int. Cl.
G02B 6/136 (2006.01)
G02B 6/122 (2006.01)
G02B 6/12 (2006.01)

(52) U.S. Cl.
CPC ............. *G02B 6/136* (2013.01); *G02B 6/122* (2013.01); *G02B 2006/12038* (2013.01);
(Continued)

(58) Field of Classification Search
None
See application file for complete search history.

(56) References Cited

U.S. PATENT DOCUMENTS 9,910,219 B2 * 3/2018 Inada .................. G02B 6/122
2004/0258347 A1 * 12/2004 Gothoskar ......... G02B 6/12007
385/14

(Continued)

FOREIGN PATENT DOCUMENTS

JP 2010-219456 A 9/2010
JP 2010-266731 A 11/2010

(Continued)

OTHER PUBLICATIONS

Office Action dated Mar. 5, 2019, in Japanese Patent Application No. 2015-155195.

*Primary Examiner* — Michael Stahl
(74) *Attorney, Agent, or Firm* — Shapiro, Gabor and Rosenberger, PLLC

(57) ABSTRACT

First, half etching is performed to a semiconductor layer formed on an insulating layer to form trenches at positions of slab-portion regions in which slab portions are to be formed. After filling the trenches with an insulating film, a resist mask which covers the semiconductor layer at a projecting-portion region in which a projecting portion is to be formed and whose pattern ends are located on upper surfaces of the insulating films is formed on upper surfaces of the semiconductor layer and the insulating film, and full etching is performed to the semiconductor layer with using the resist mask and the insulating film as an etching mask, thereby forming an optical waveguide constituted of the projecting portion and the slab portions. Thereafter, a first interlayer insulating film is formed to cover the optical waveguide.

8 Claims, 27 Drawing Sheets

(52) U.S. Cl.
CPC .............. *G02B 2006/12061* (2013.01); *G02B 2006/12097* (2013.01); *G02B 2006/12176* (2013.01)

(56) References Cited

U.S. PATENT DOCUMENTS

| | | | |
|---|---|---|---|
| 2005/0008314 A1* | 1/2005 | Drake | G02B 6/1228 385/129 |
| 2008/0310808 A1* | 12/2008 | Fried | G02B 6/136 385/129 |
| 2010/0140708 A1 | 6/2010 | Hill et al. | |
| 2010/0247029 A1 | 9/2010 | Li et al. | |
| 2011/0311178 A1 | 12/2011 | Fujikata et al. | |
| 2013/0188918 A1 | 7/2013 | Painchaud et al. | |
| 2015/0056740 A1 | 2/2015 | Menezo | |
| 2015/0212344 A1 | 7/2015 | Patel et al. | |
| 2015/0212386 A1 | 7/2015 | Patel et al. | |
| 2015/0346520 A1 | 12/2015 | Lee et al. | |
| 2016/0147087 A1 | 5/2016 | Patel et al. | |
| 2016/0170240 A1 | 6/2016 | Adams et al. | |
| 2016/0291350 A1 | 10/2016 | Fujikata et al. | |
| 2017/0031095 A1 | 2/2017 | Nakashiba et al. | |
| 2017/0269393 A1 | 9/2017 | Adams et al. | |

FOREIGN PATENT DOCUMENTS

| | | |
|---|---|---|
| JP | 2015-129827 A | 7/2015 |
| WO | WO 2010/098248 A1 | 9/2010 |
| WO | WO 2015/112814 A1 | 7/2015 |

\* cited by examiner

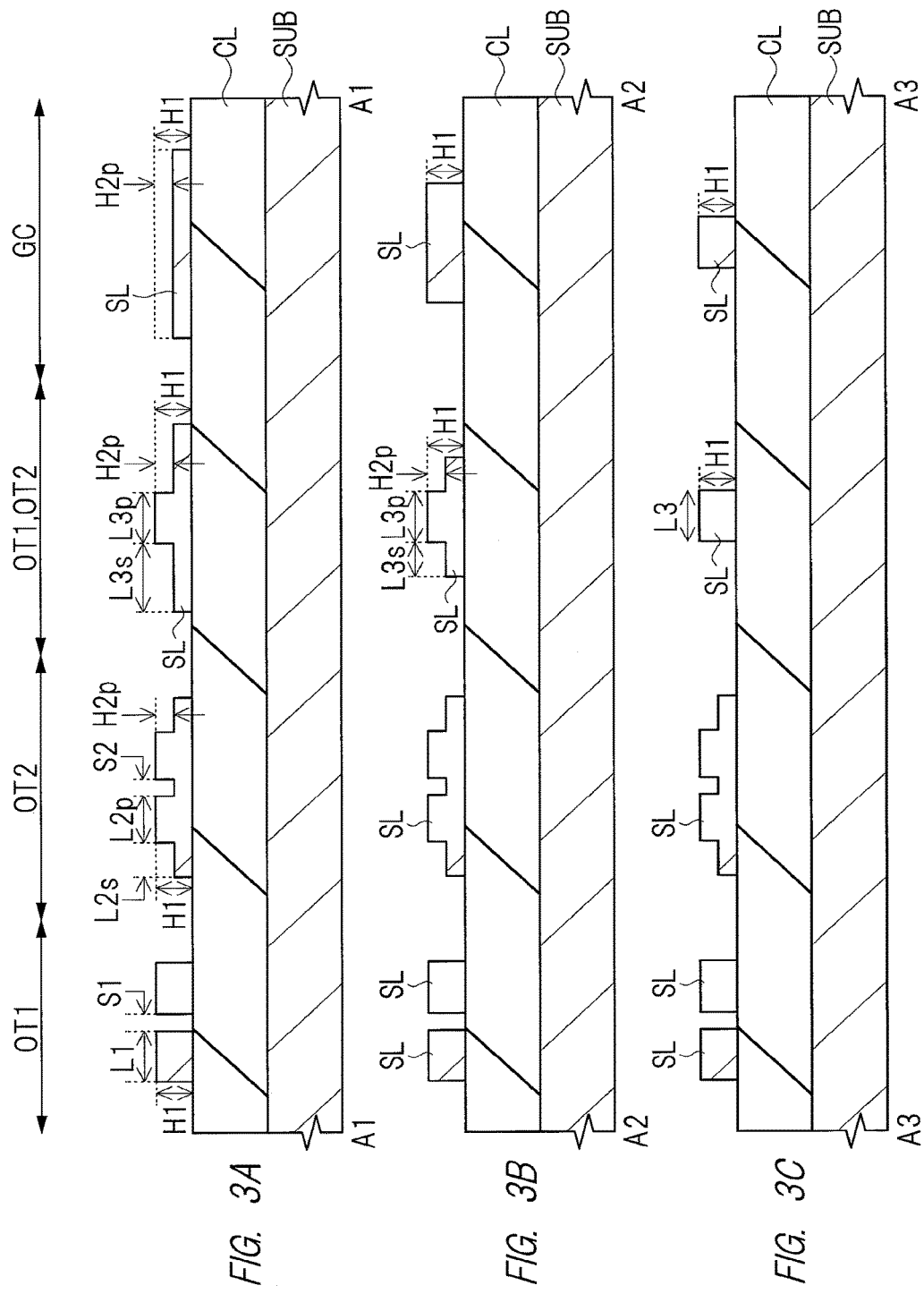

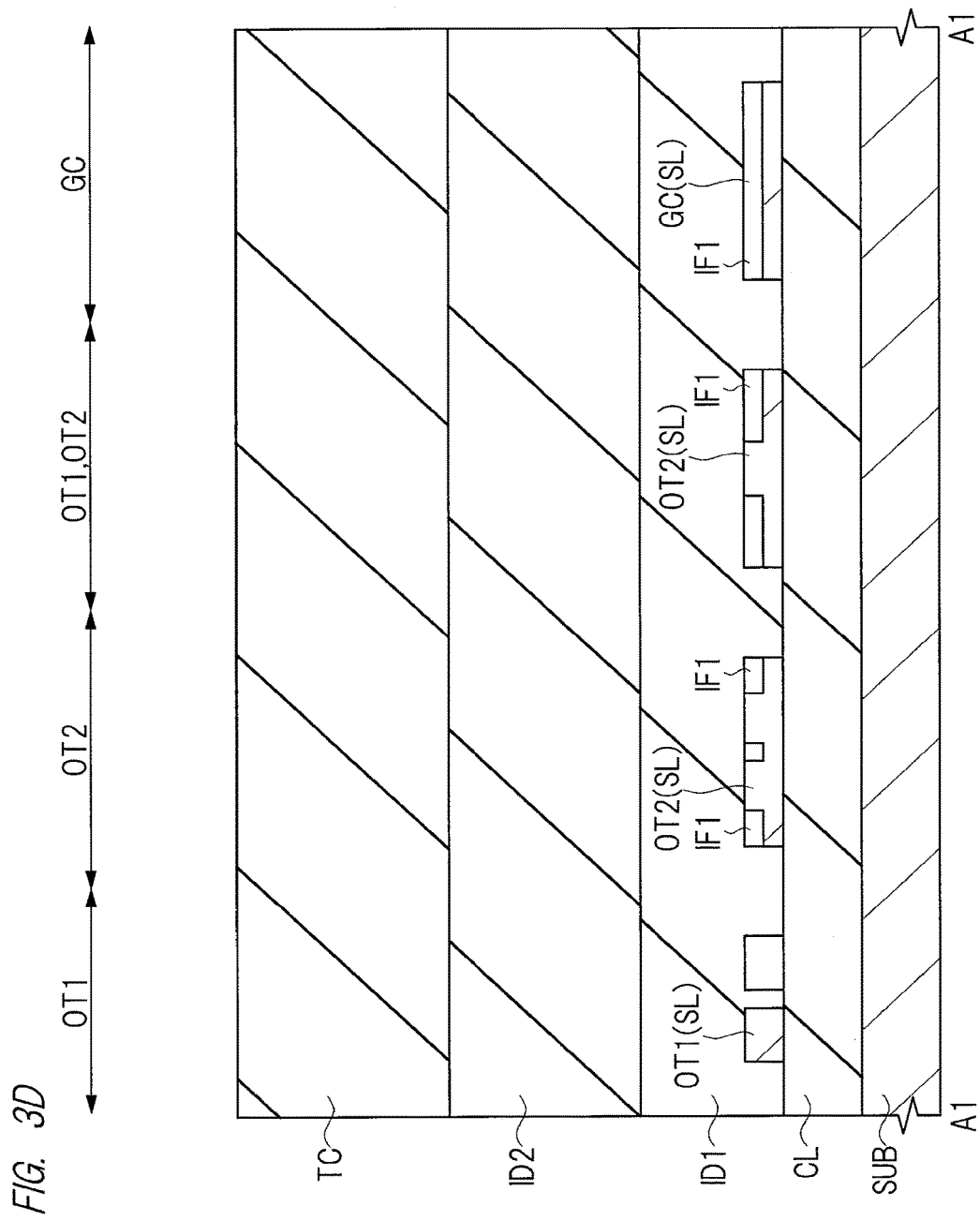

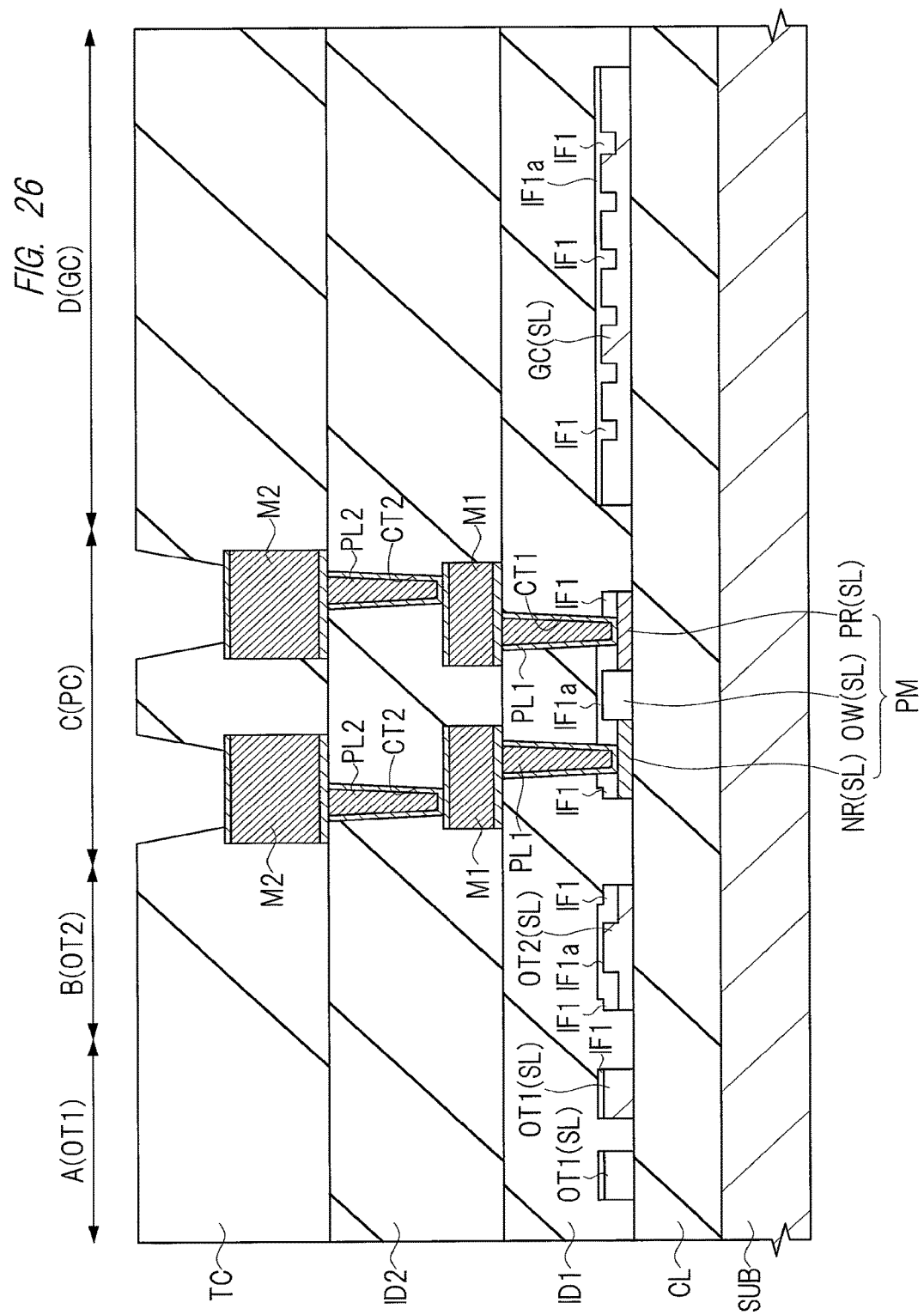

SEMICONDUCTOR DEVICE AND MANUFACTURING METHOD THEREOF

CROSS-REFERENCE TO RELATED APPLICATION

The present application claims priority from Japanese Patent Application No. 2015-155195 filed on Aug. 5, 2015, the content of which is hereby incorporated by reference into this application.

TECHNICAL FIELD OF THE INVENTION

The present invention relates to a semiconductor device and a manufacturing method thereof, and can be effectively applied to, for example, a semiconductor device incorporating a silicon photonics device provided with a silicon optical waveguide with a rib structure.

BACKGROUND OF THE INVENTION

Japanese Patent Application Laid-Open Publication No. 2010-219456 (Patent Document 1) discloses a pattern forming method including a step of performing a first anisotropic etching using a first hard mask layer as an etching mask to a substrate, a step of forming a second hard mask layer on the substrate on which a step portion has been formed by the first anisotropic etching, and a step of performing a second anisotropic etching to the substrate with using the second hard mask layer as an etching mask.

SUMMARY OF THE INVENTION

When forming a silicon optical waveguide with a rib structure (also referred to as ridge structure), a silicon layer is first etched halfway in a thickness direction with using a first mask to form an upper step portion of a convex shape, and the silicon layer is further etched in the thickness direction with using a as convex shape. In the forming method described above, however, the silicon optical waveguide with the rib structure becomes asymmetric in a cross section orthogonal to an optical waveguide direction due to misalignment between the first mask and the second mask, and this causes the loss in optical characteristics.

Other problems and novel features will be apparent from description of the present specification and the attached drawings.

In a semiconductor device according to an embodiment, an optical waveguide has a rib structure including a projecting portion which is made of a semiconductor layer with a first thickness and slab portions which are formed integrally with the projecting portion and made of the semiconductor layer disposed on both sides of the projecting portion and having a second thickness smaller than the first thickness. The optical waveguide is covered with a first interlayer insulating film, and an insulating film different from the first interlayer insulating film is formed on each of upper surfaces of the slab portions and on an outer side of side surfaces of a protruding portion of the projecting portion.

In a manufacturing method of a semiconductor device according to an embodiment, an optical waveguide with a rib structure is formed by the following process. First, a first resist mask having openings at positions of slab-portion regions in which slab portions are to be formed is formed on an upper surface of a semiconductor layer of an SOI substrate, and the semiconductor layer is half-etched with using the first resist mask as an etching mask, thereby forming trenches in the slab-portion regions. After filling the trenches with an insulating film, a second resist mask which covers the semiconductor layer of a projecting-portion region in which the projecting portion is to be formed and whose pattern ends are located on upper surfaces of the insulating films is formed on the upper surface of the semiconductor layer and on the upper surfaces of the insulating films. Then, the semiconductor layer is fully etched with using the second resist mask and the insulating films as an etching mask, thereby forming an optical waveguide including the projecting portion and the slab portions.

According to an embodiment, it is possible to provide a semiconductor device incorporating a silicon photonics device provided with a silicon optical waveguide with a highly symmetric rib structure.

BRIEF DESCRIPTIONS OF THE DRAWINGS

FIG. 1 is a schematic diagram showing an example of a configuration of a semiconductor device according to the first embodiment;

FIG. 2 is a plan view showing a main part of an optical device according to the first embodiment, in which main parts of a first optical signal line constituted of an optical waveguide whose cross section orthogonal to an optical waveguide direction has a quadrangular shape, a second optical signal line constituted of an optical waveguide whose cross section orthogonal to the optical waveguide direction has a convex shape, a converting part of the first optical signal line and the second optical signal line and a grating coupler are illustrated;

FIG. 3A is a cross-sectional view showing a main part of the optical waveguide taken along the line A1-A1 of FIG. 2;

FIG. 3B is a cross-sectional view showing a main part of the optical waveguide taken along the line A2-A2 of FIG. 2;

FIG. 3C is a cross-sectional view showing a main part of the optical waveguide taken along the line A3-A3 of FIG. 2;

FIG. 3D is a cross-sectional view showing a main part of the optical waveguide taken along the line A1-A1 of FIG. 2;

Figure 5:
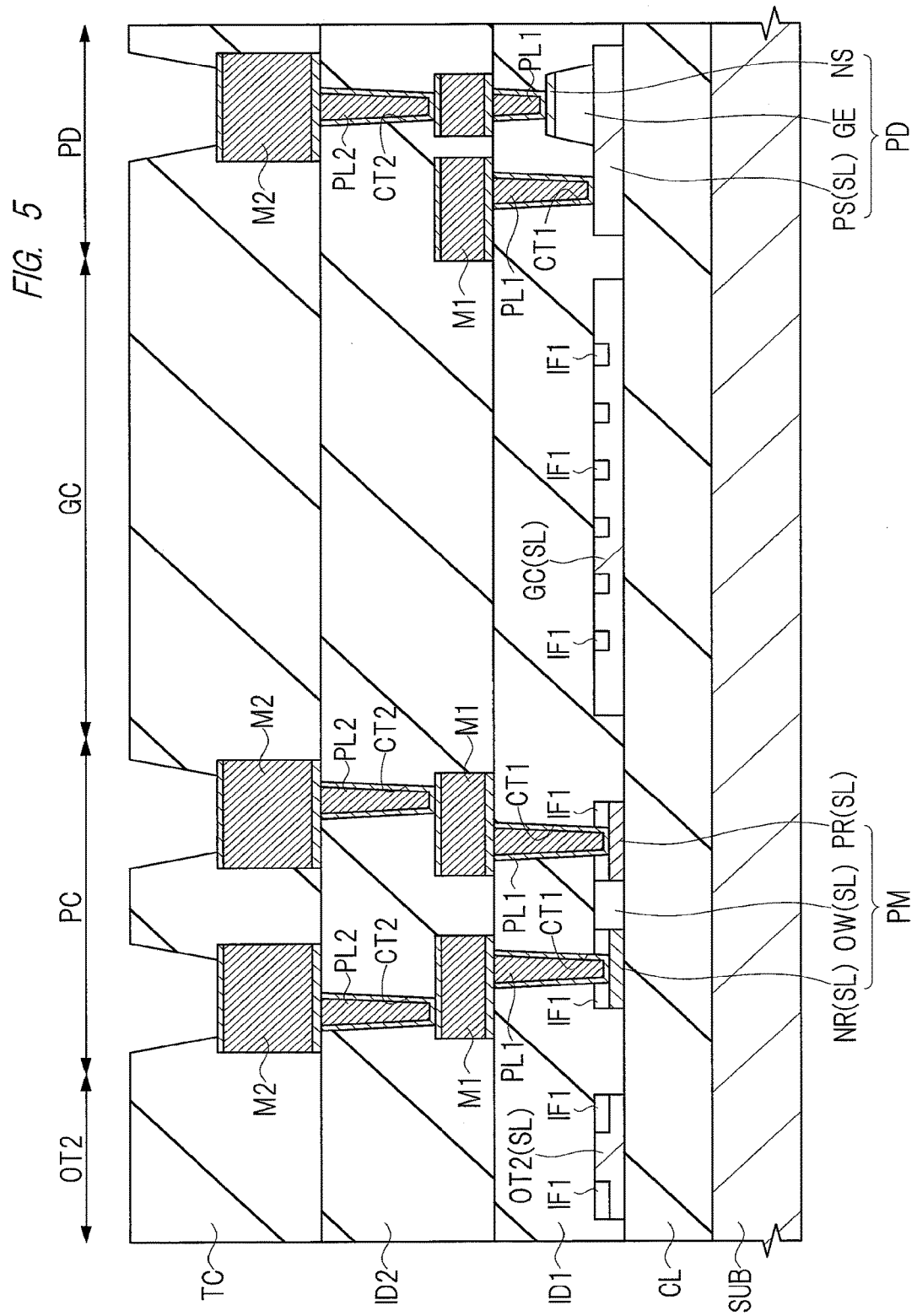
Figure 6:
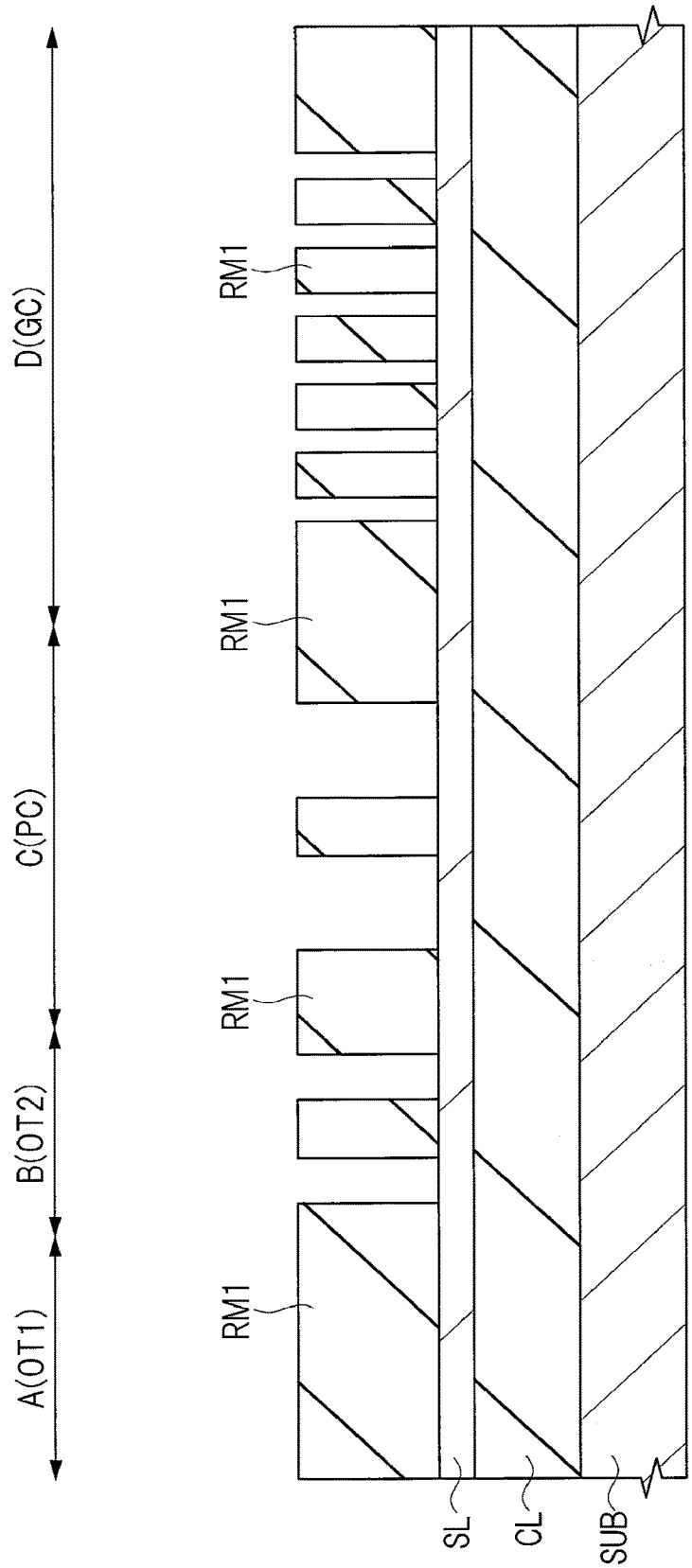
Figure 7:
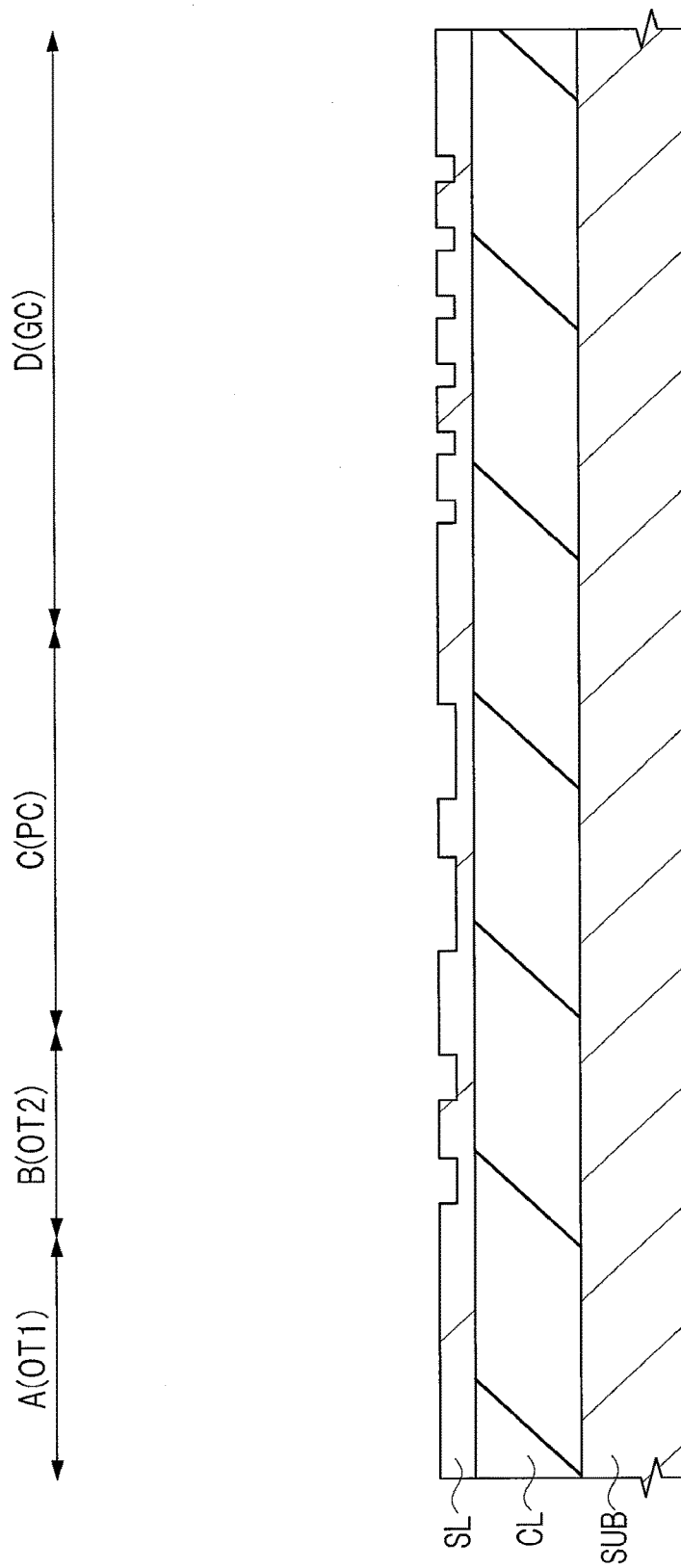
Figure 8:
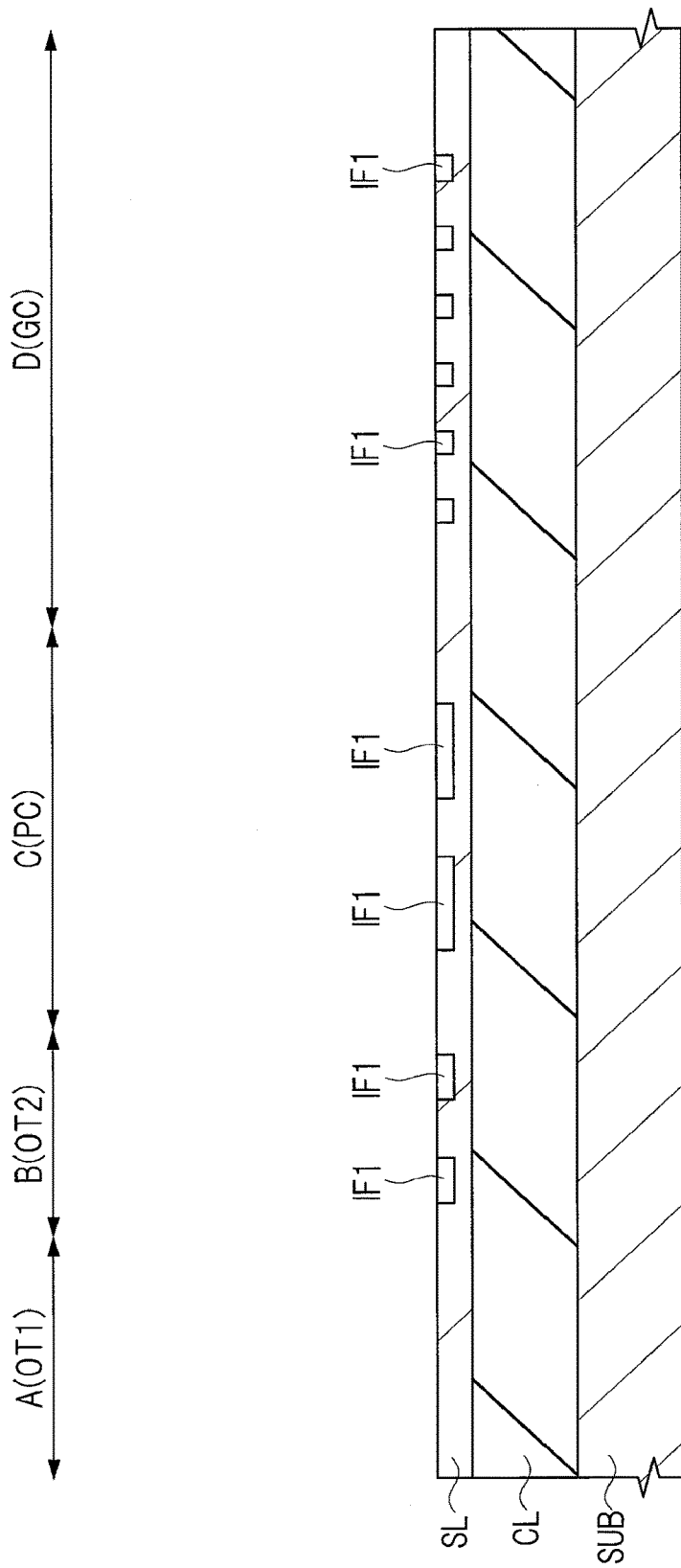
Figure 9:
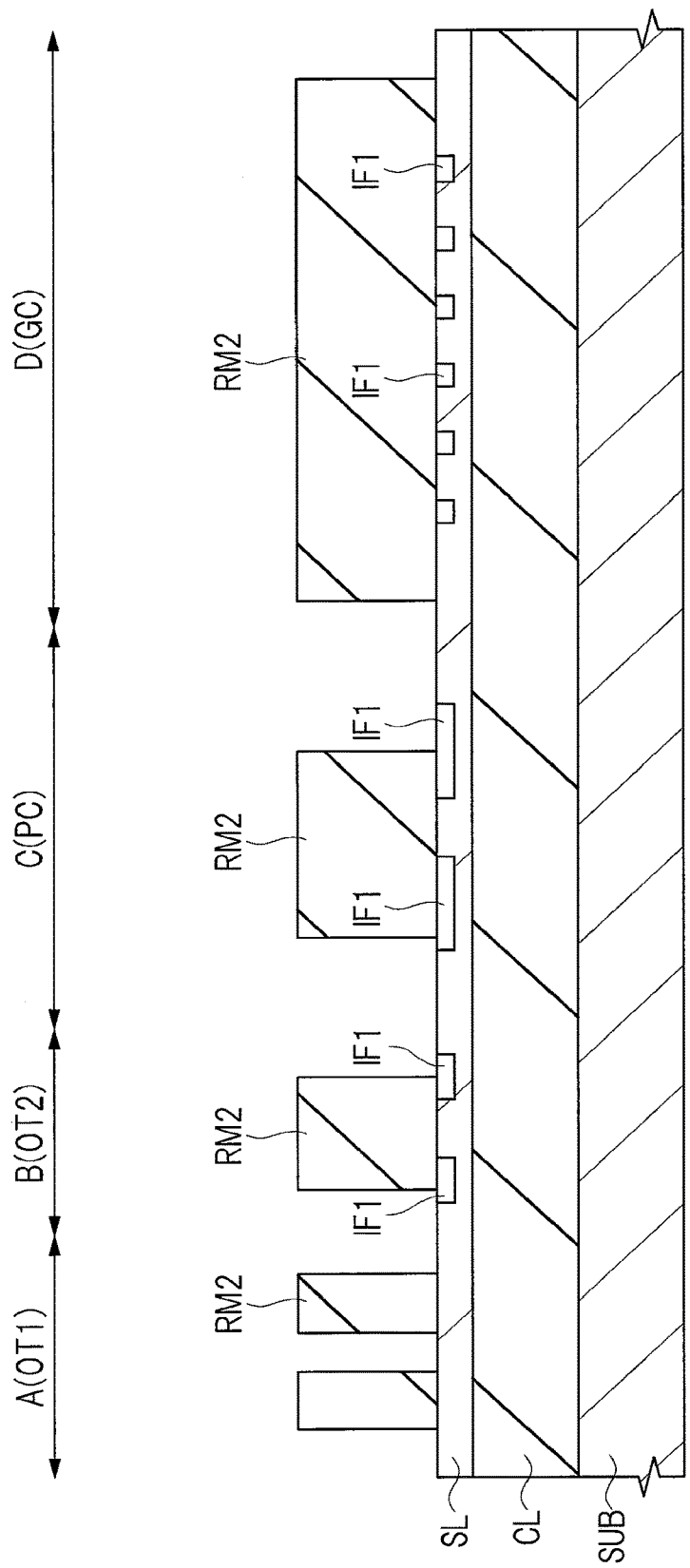
Figure 10:
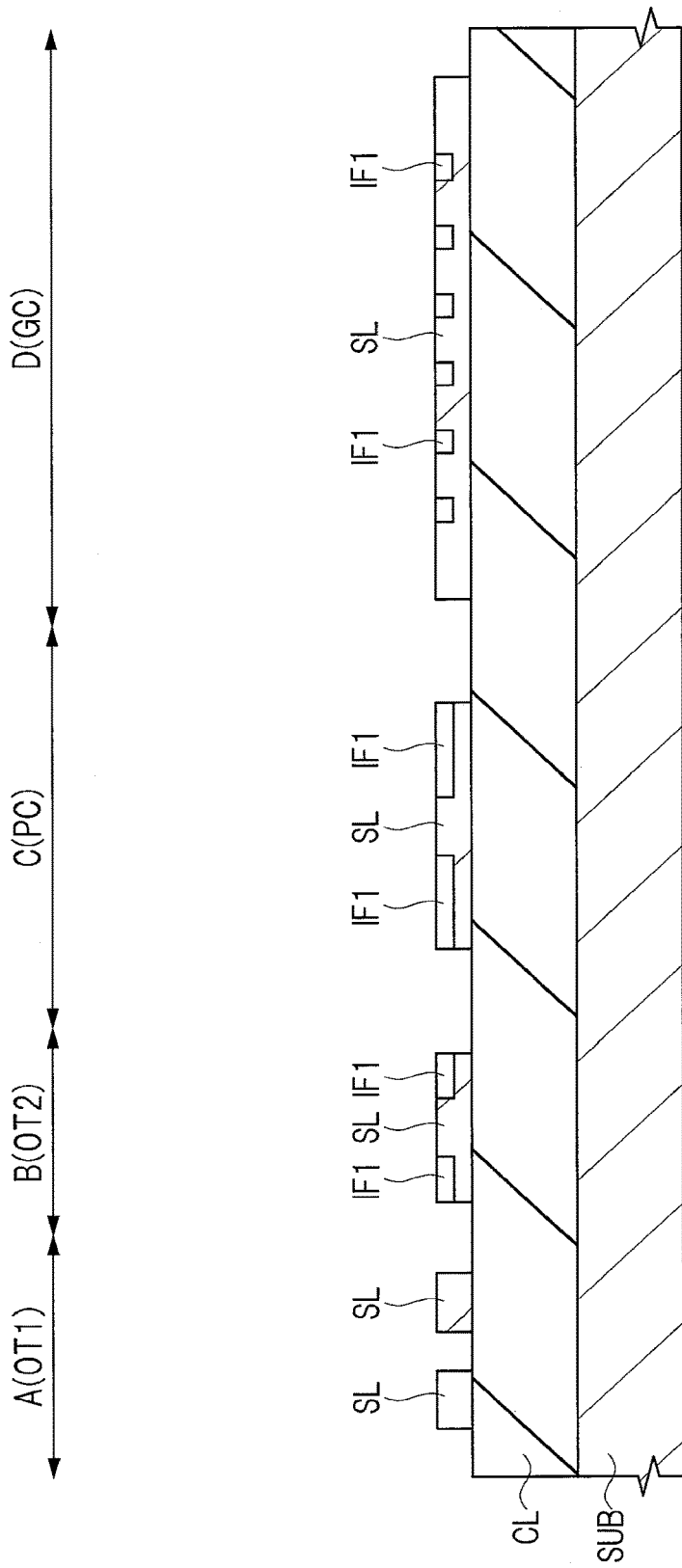
Figure 11:
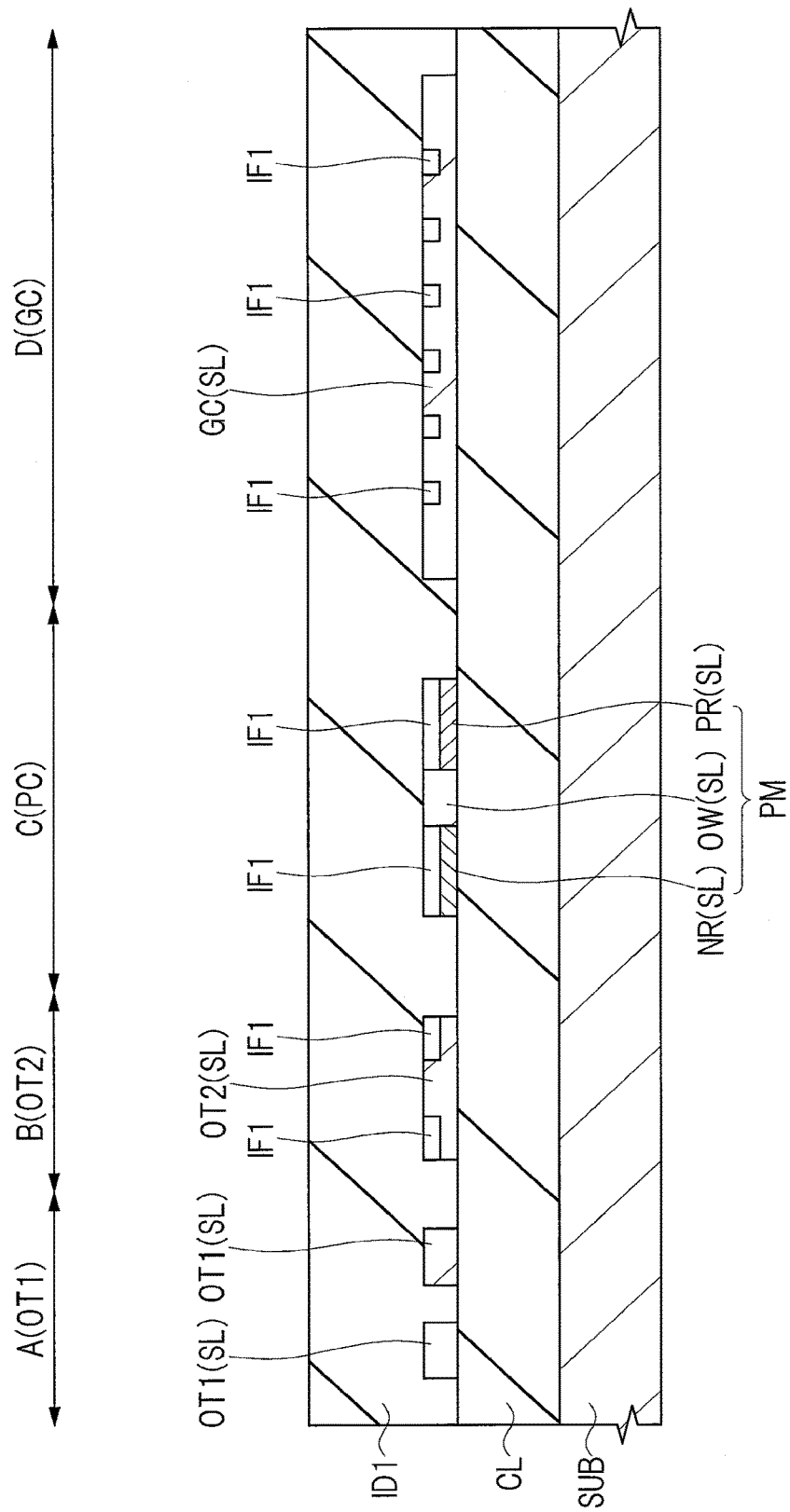
Figure 12:
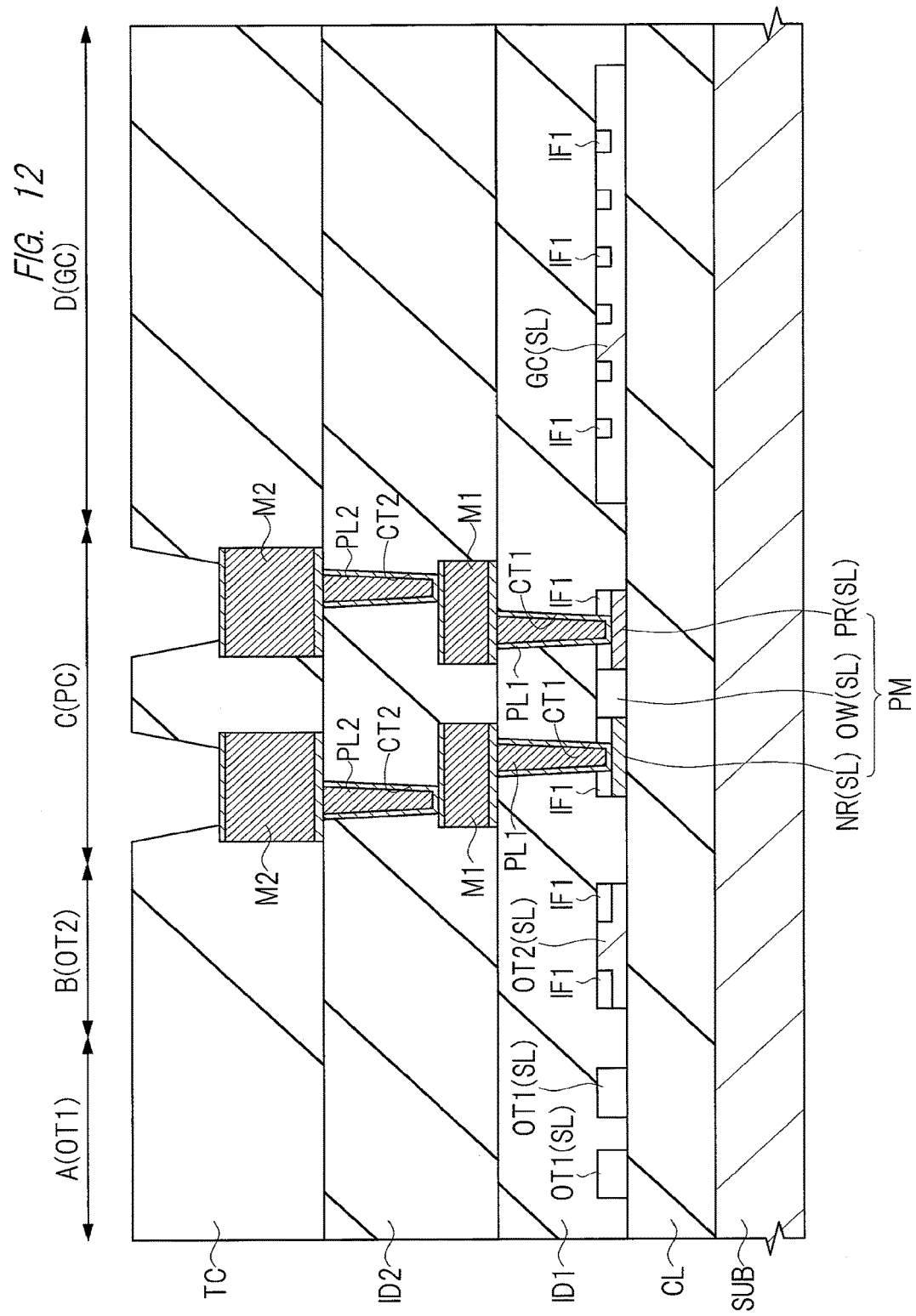
Figure 13:
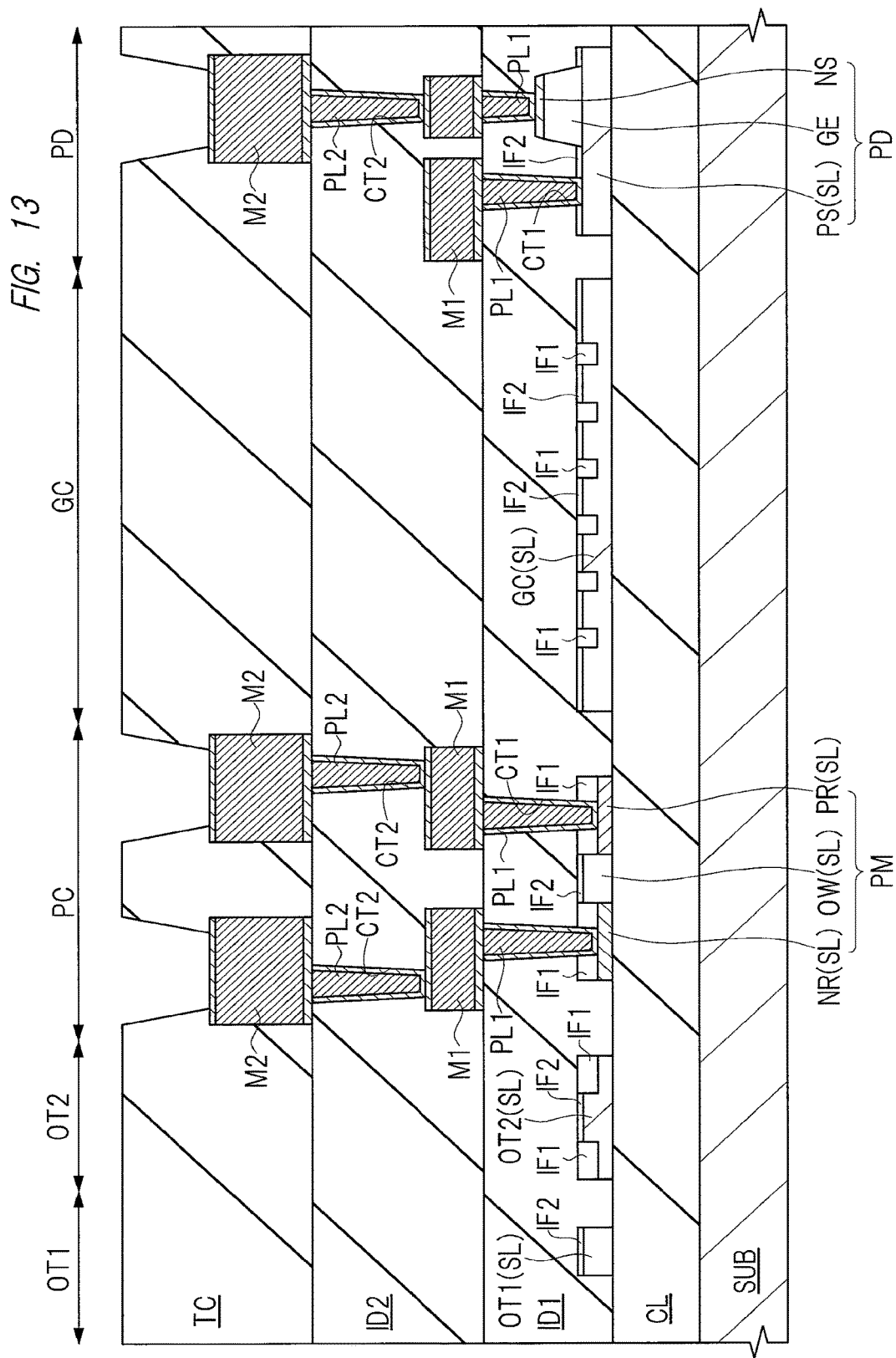
Figure 14:
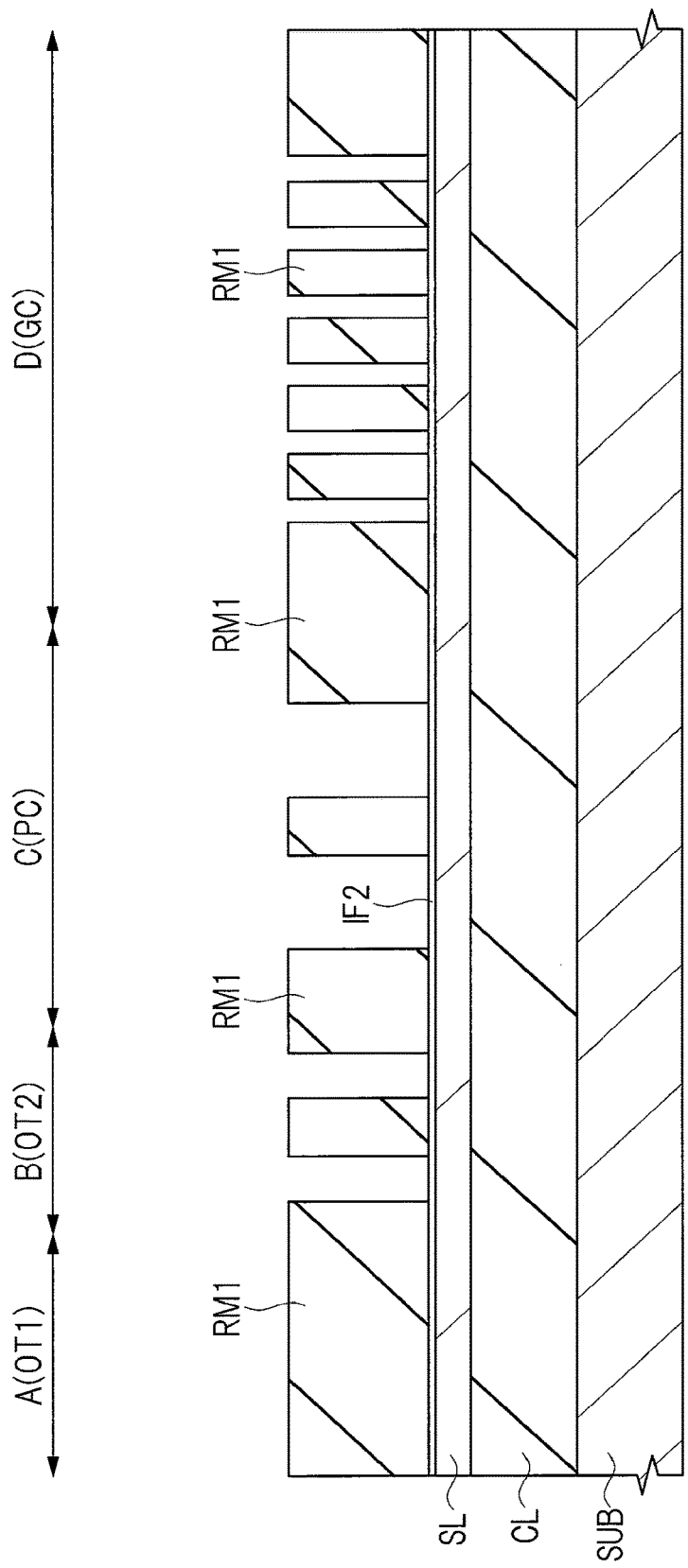
Figure 15:
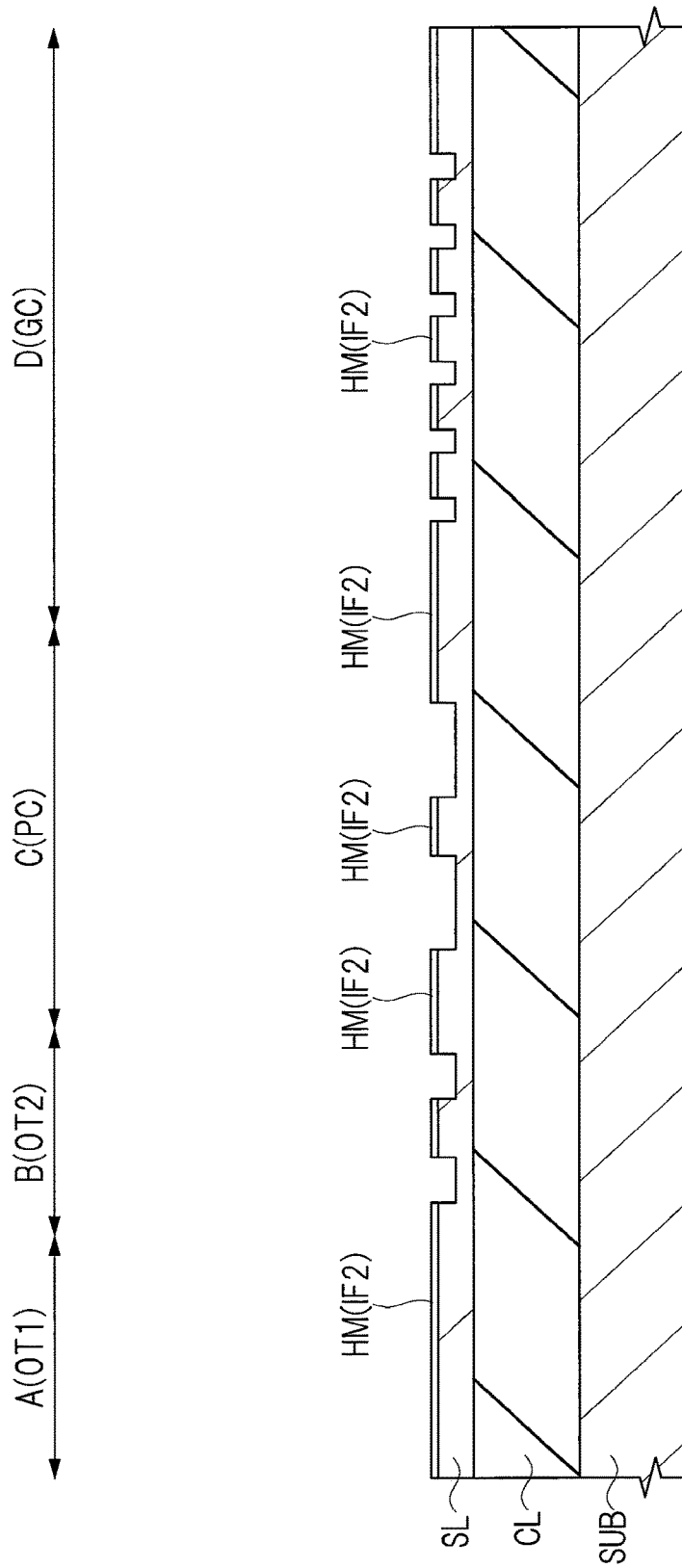
Figure 16:
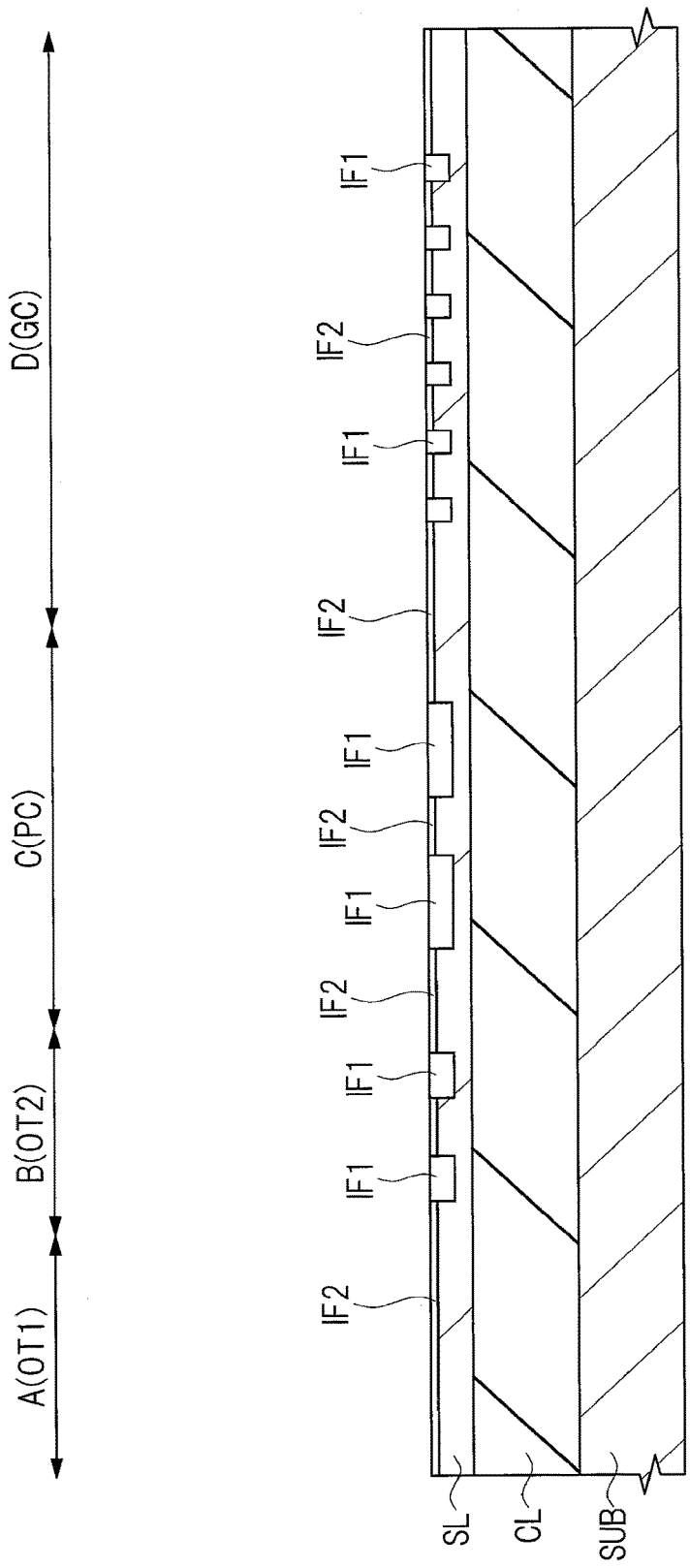
Figure 17:
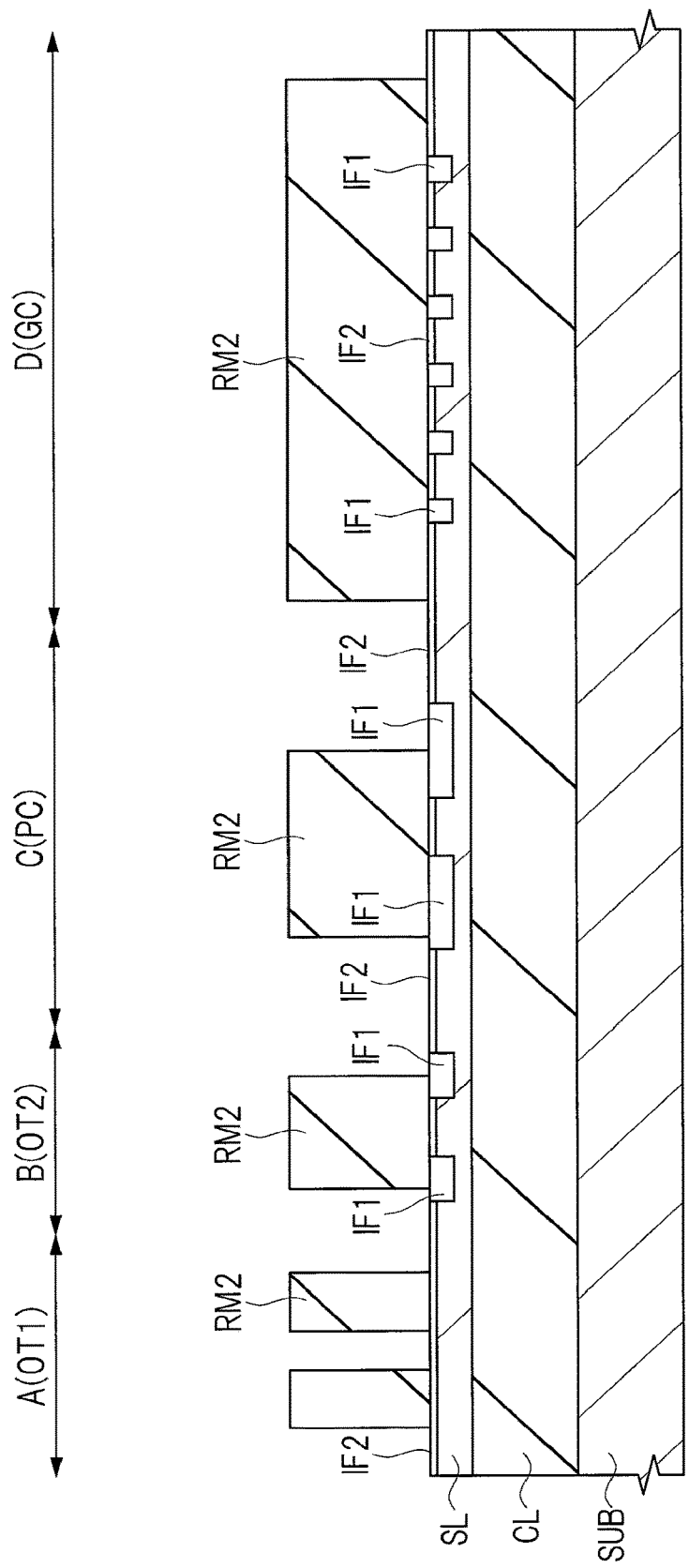
Figure 18:
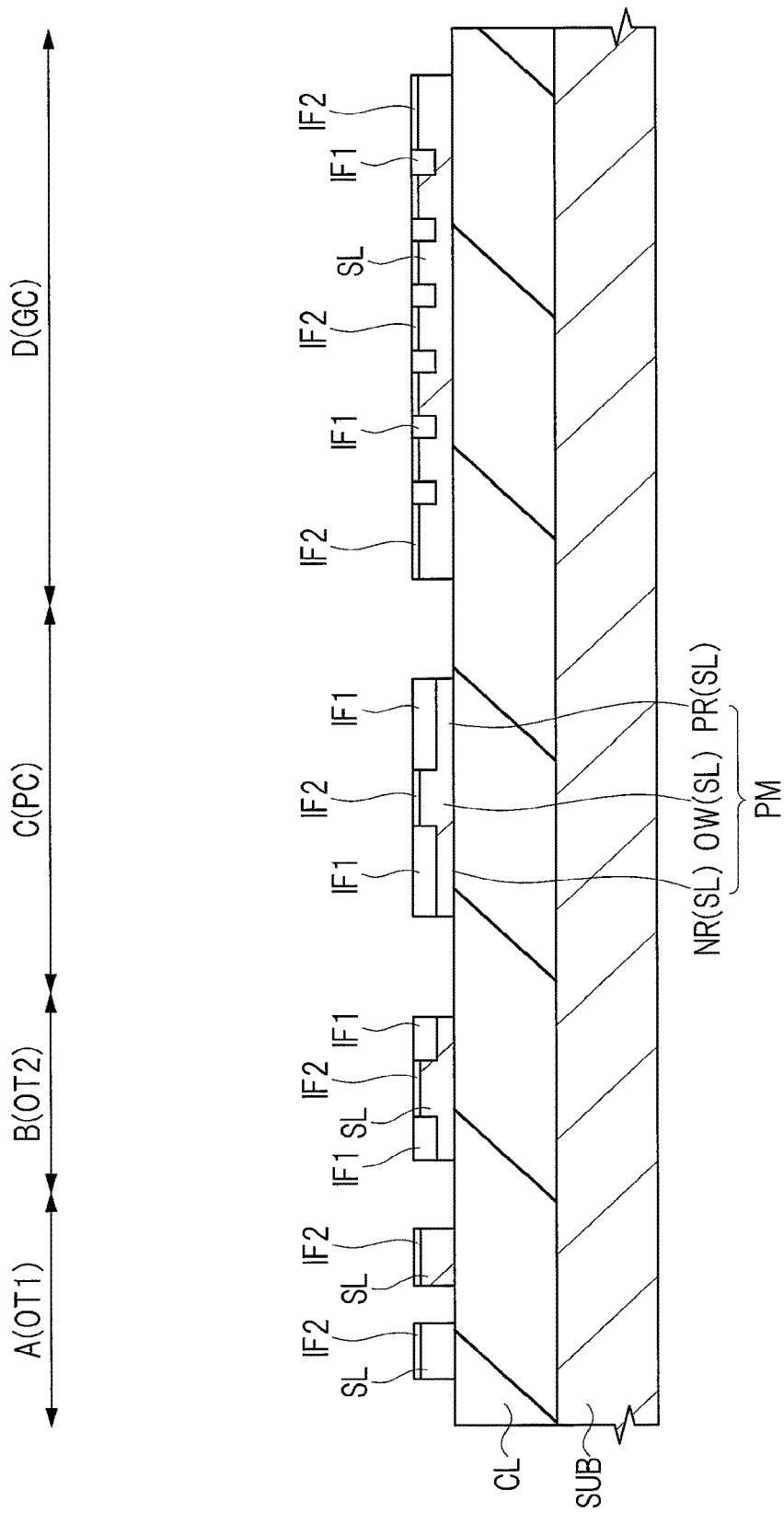
Figure 19:
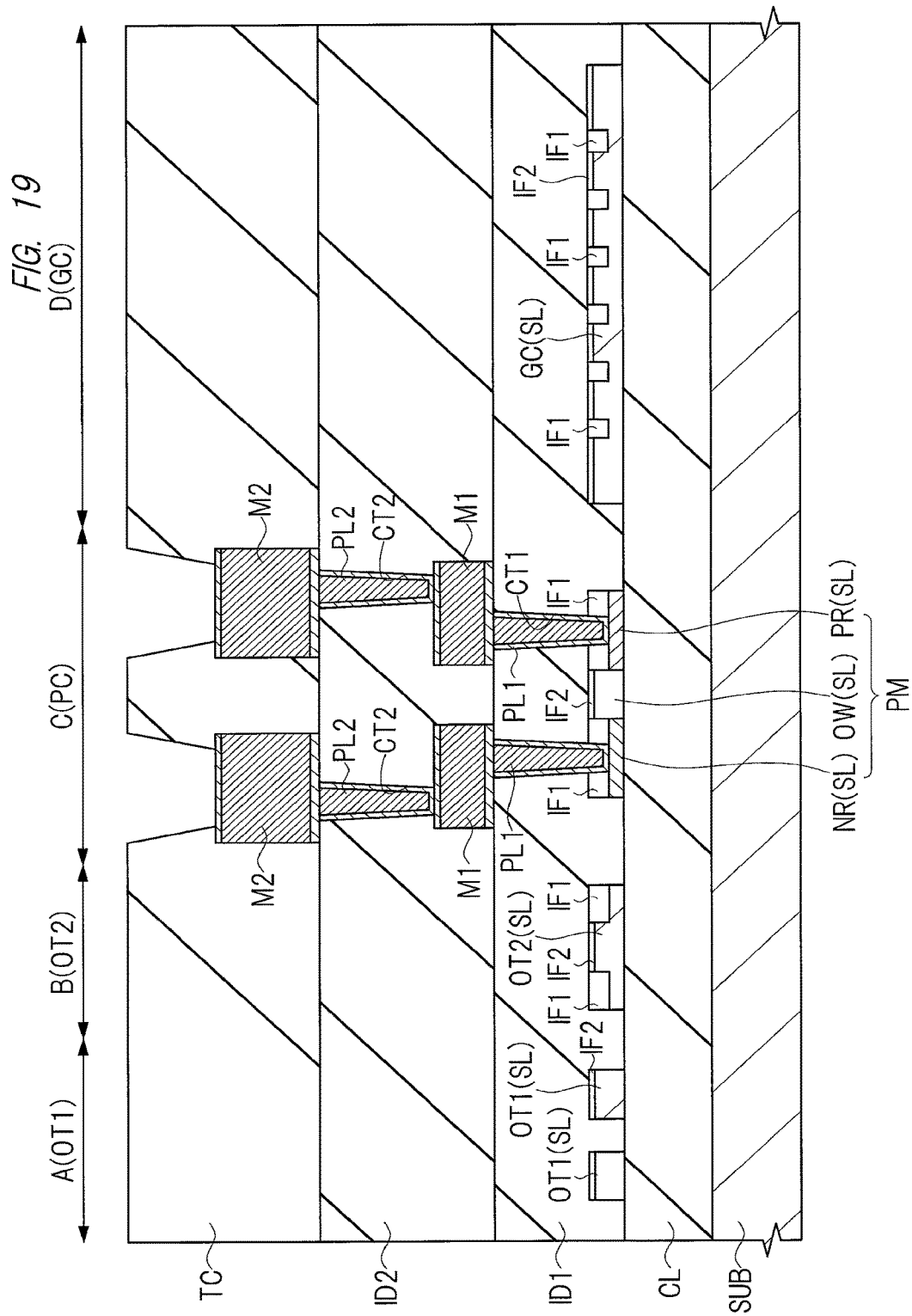
Figure 20:
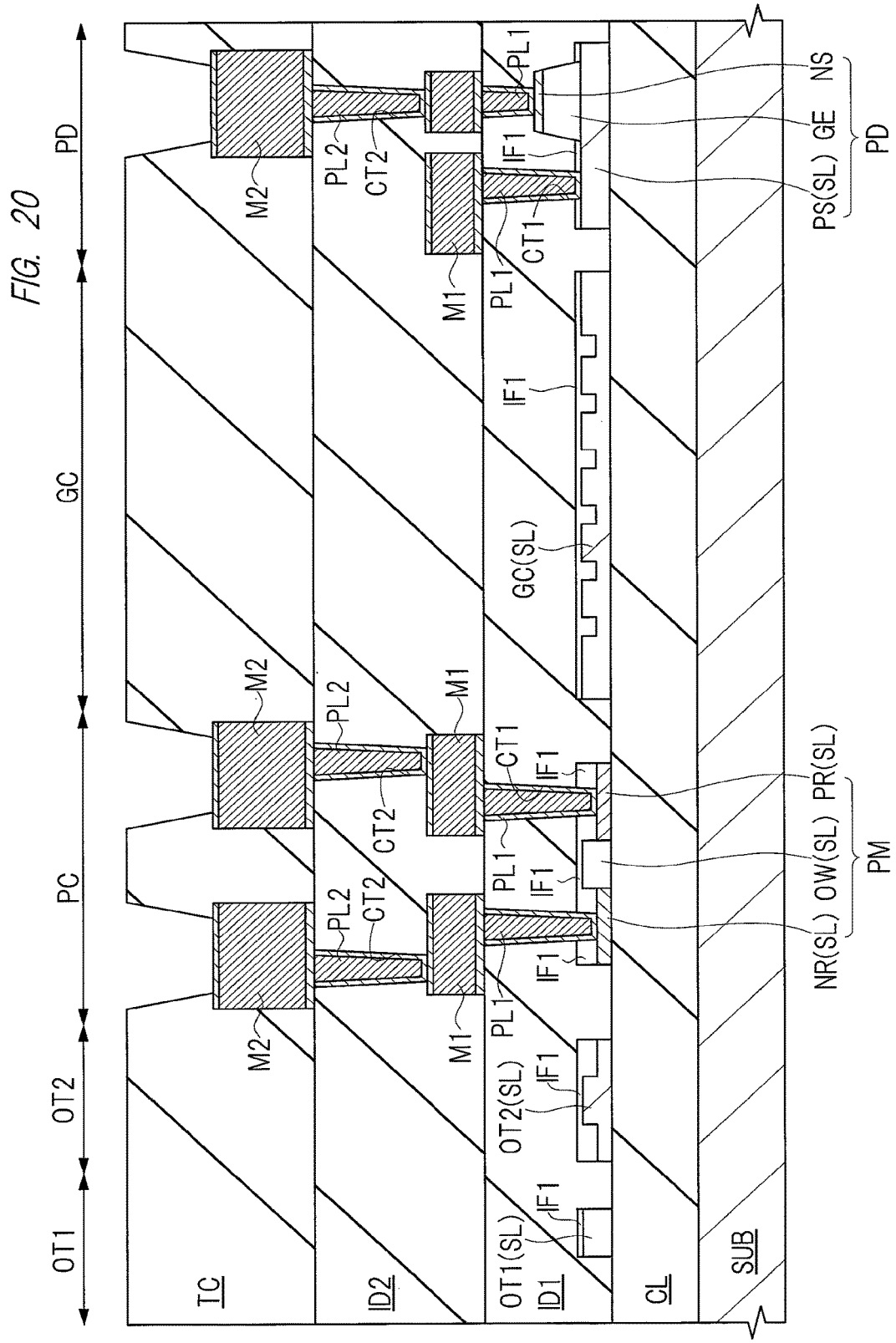
Figure 21:
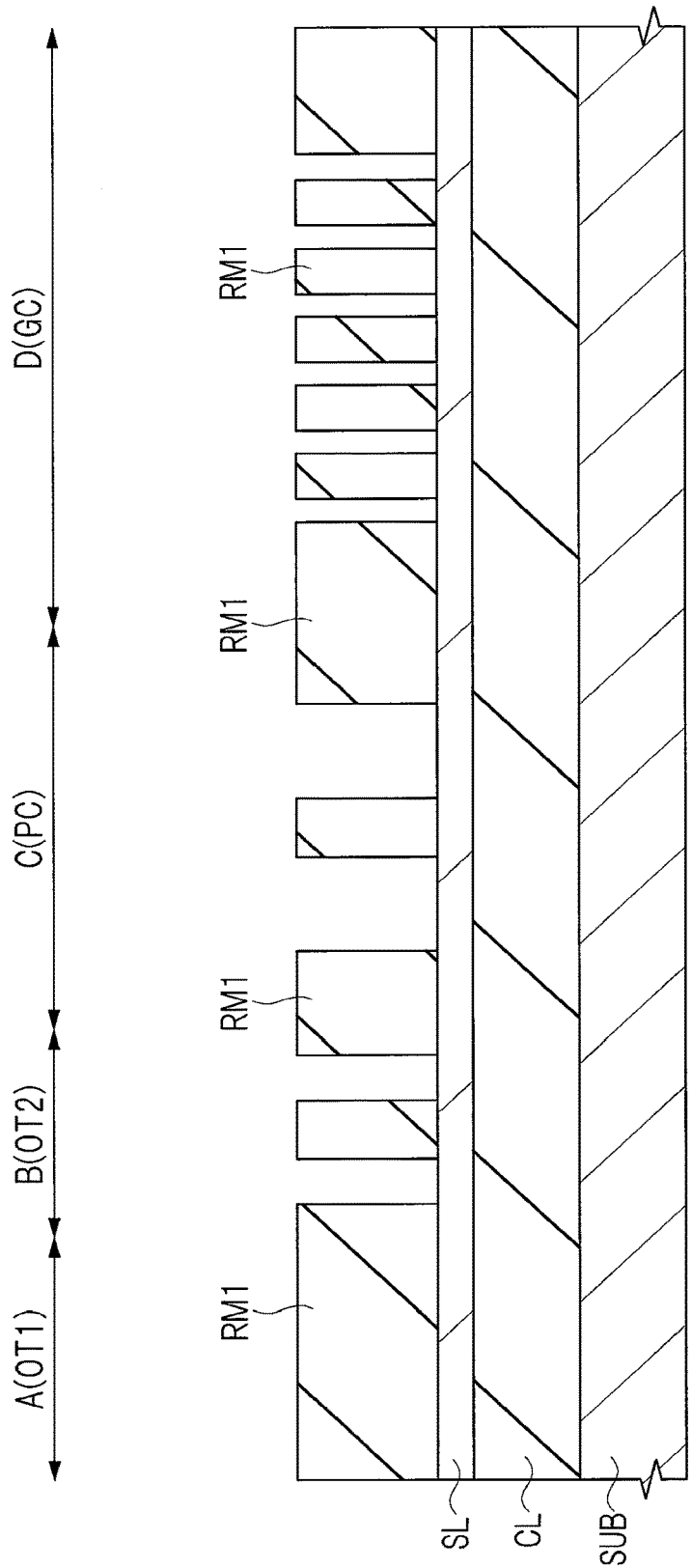
Figure 22:
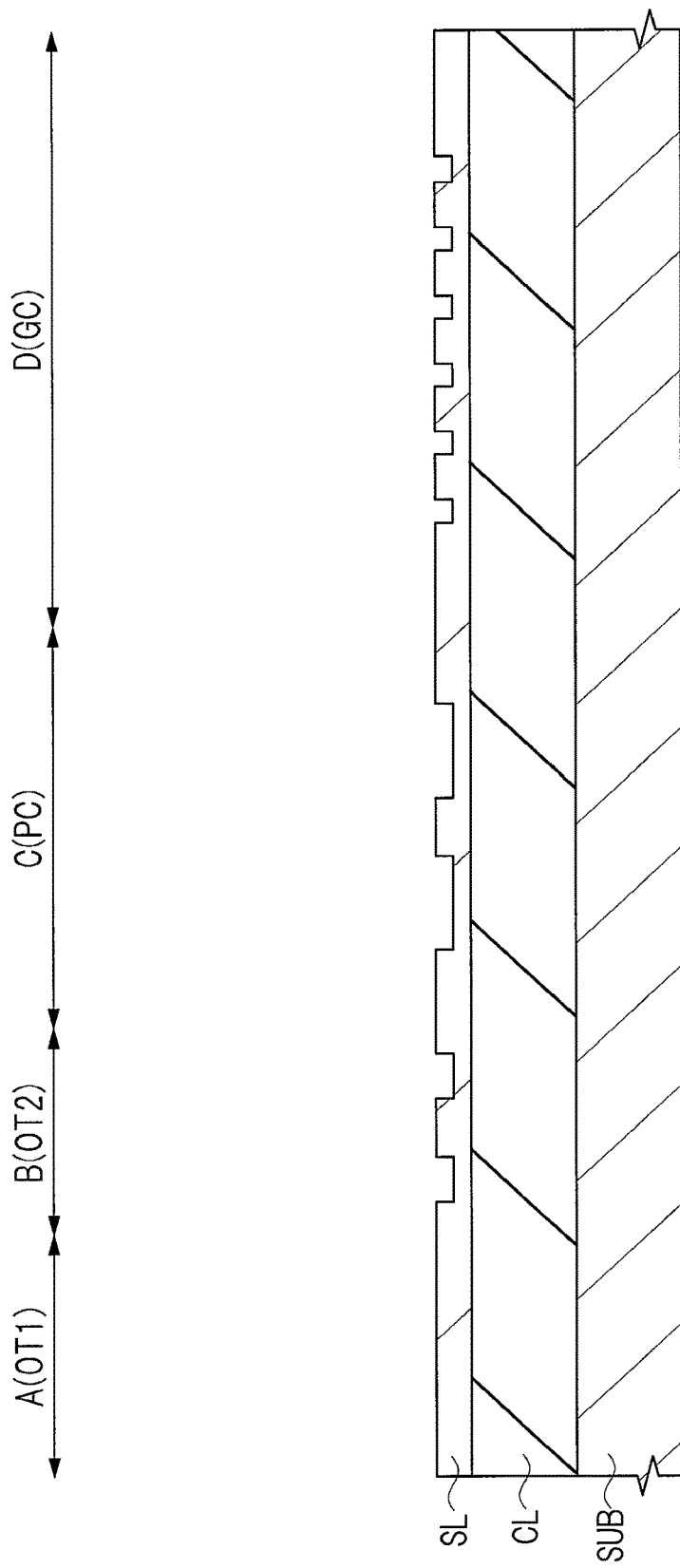
Figure 23:
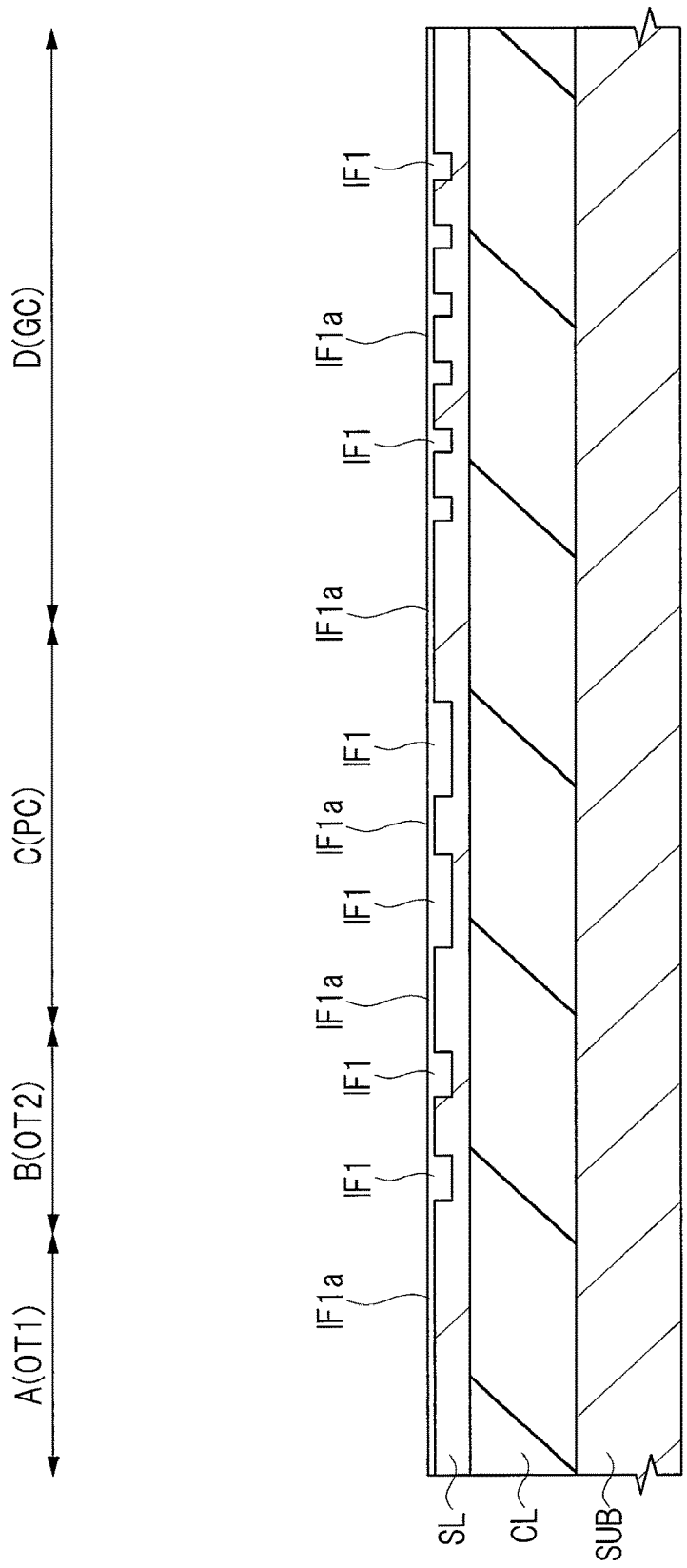
Figure 24:
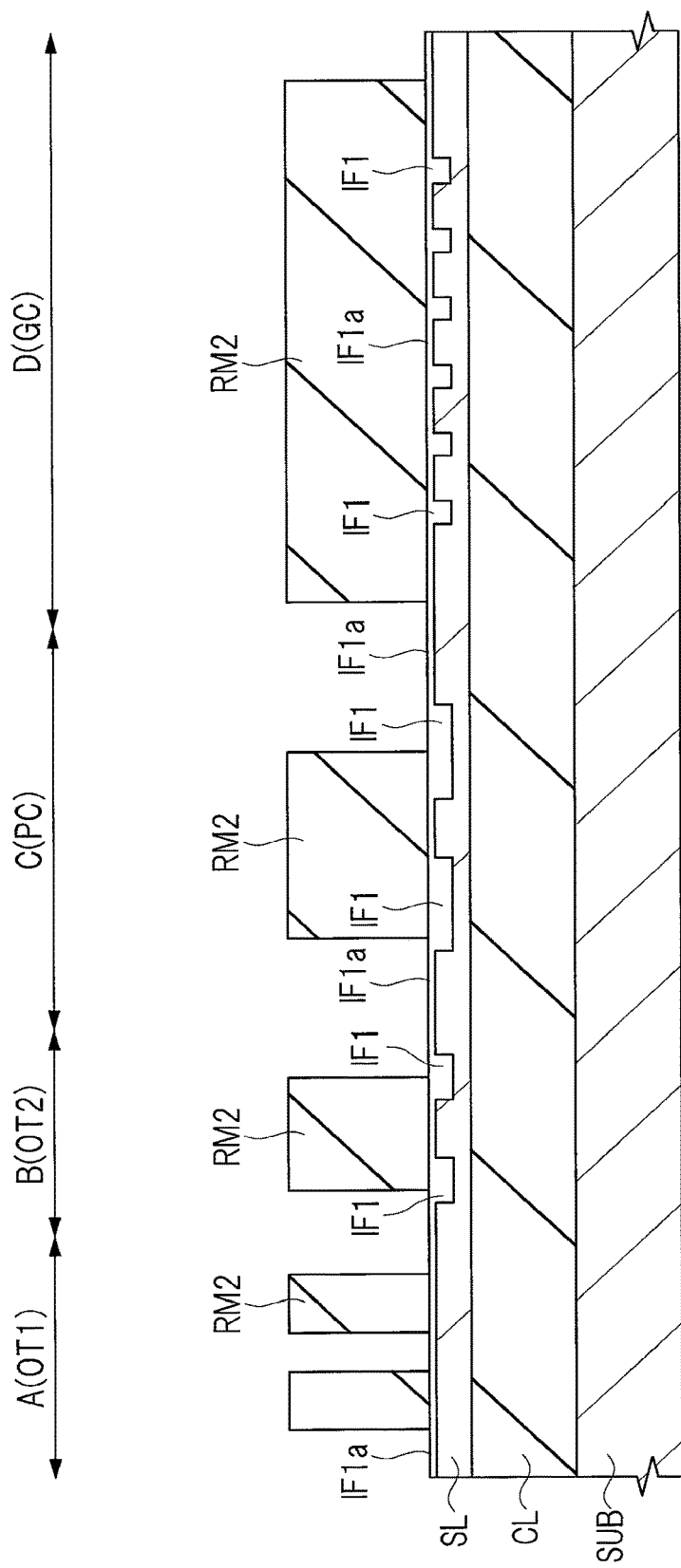
Figure 25:
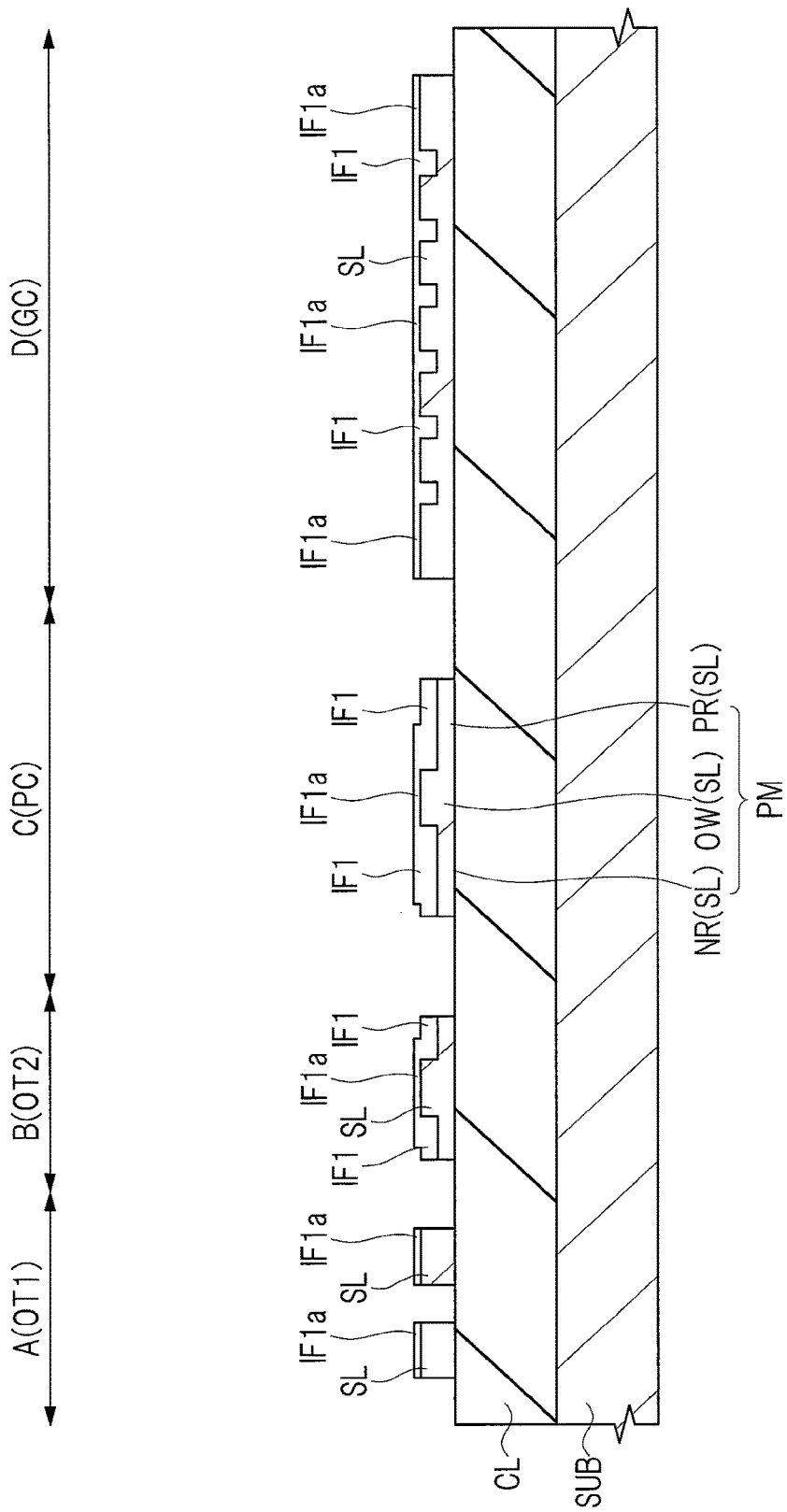

FIG. 5 is a cross-sectional view showing a main part of the optical device according to the first embodiment, in which main parts of the second optical signal line constituted of an optical waveguide whose cross section orthogonal to the optical waveguide direction has a convex shape, the grating coupler, a phase modulating part of the optical modulator and a germanium optical receiver are illustrated;

FIG. 6 is a cross-sectional view showing a main part of a manufacturing process of an optical device according to the first embodiment, in which main parts of the first optical signal line constituted of an optical waveguide whose cross section orthogonal to the optical waveguide direction has a quadrangular shape, the second optical signal line constituted of an optical waveguide whose cross section orthogonal to the optical waveguide direction has a convex shape, the grating coupler and the phase modulating part of the optical modulator are illustrated;

FIG. 7 is a cross-sectional view showing a main part of the manufacturing process of the optical device continued from FIG. 6;

FIG. 8 is a cross-sectional view showing a main part of the manufacturing process of the optical device continued from FIG. 7;

FIG. 9 is a cross-sectional view showing a main part of the manufacturing process of the optical device continued from FIG. 8;

FIG. 10 is a cross-sectional view showing a main part of the manufacturing process of the optical device continued from FIG. 9;

FIG. 11 is a cross-sectional view showing a main part of the manufacturing process of the optical device continued from FIG. 10;

FIG. 12 is a cross-sectional view showing a main part of the manufacturing process of the optical device continued from FIG. 11;

FIG. 13 is a cross-sectional view showing a main part of an optical device according to the second embodiment, in which main parts of a first optical signal line constituted of an optical waveguide whose cross section orthogonal to an optical waveguide direction has a quadrangular shape, a second optical signal line constituted of an optical waveguide whose cross section orthogonal to the optical waveguide direction has a convex shape, a grating coupler, a phase modulating part of an optical modulator and a germanium optical receiver are illustrated;

FIG. 14 is a cross-sectional view showing a main part of a manufacturing process of an optical device according to the second embodiment, in which main parts of the first optical signal line constituted of an optical waveguide whose cross section orthogonal to the optical waveguide direction has a quadrangular shape, the second optical signal line constituted of an optical waveguide whose cross section orthogonal to the optical waveguide direction has a convex shape, the grating coupler and the phase modulating part of the optical modulator are illustrated;

FIG. 15 is a cross-sectional view showing a main part of the manufacturing process of the optical device continued from FIG. 14;

FIG. 16 is a cross-sectional view showing a main part of the manufacturing process of the optical device continued from FIG. 15;

FIG. 17 is a cross-sectional view showing a main part of the manufacturing process of the optical device continued from FIG. 16;

FIG. 18 is a cross-sectional view showing a main part of the manufacturing process of the optical device continued from FIG. 17;

FIG. 19 is a cross-sectional view showing a main part of the manufacturing process of the optical device continued from FIG. 18;

FIG. 20 is a cross-sectional view showing a main part of an optical device according to the third embodiment, in which main parts of a first optical signal line constituted of an optical waveguide whose cross section orthogonal to an optical waveguide direction has a quadrangular shape, a second optical signal line constituted of an optical waveguide whose cross section orthogonal to the optical waveguide direction has a convex shape, a grating coupler, a phase modulating part of an optical modulator and a germanium optical receiver are illustrated;

FIG. 21 is a cross-sectional view showing a main part of a manufacturing process of an optical device according to the third embodiment, in which main parts of the first optical signal line constituted of an optical waveguide whose cross section orthogonal to the optical waveguide direction has a quadrangular shape, the second optical signal line constituted of an optical waveguide whose cross section orthogonal to the optical waveguide direction has a convex shape, the grating coupler and the phase modulating part of the optical modulator are illustrated;

FIG. 22 is a cross-sectional view showing a main part of the manufacturing process of the optical device continued from FIG. 21;

FIG. 23 is a cross-sectional view showing a main part of the manufacturing process of the optical device continued from FIG. 22;

FIG. 24 is a cross-sectional view showing a main part of the manufacturing process of the optical device continued from FIG. 23;

FIG. 25 is a cross-sectional view showing a main part of the manufacturing process of the optical device continued from FIG. 24; and FIG. 26 is a cross-sectional view showing a main part of the manufacturing process of the optical device continued from FIG. 25.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, the components (including element steps) are not always indispensable unless otherwise stated or except the case where the components are apparently indispensable in principle.

Also, even when mentioning that a component is "made of A", "made up of A", "has A" or "includes A" in the embodiments below, elements other than A are of course not excluded except the case where it is particularly specified that A is the only element thereof. Similarly, in the embodiments described below, when the shape of the components, positional relation thereof and the like are mentioned, the substantially approximate and similar shapes and the like are included therein unless otherwise stated or except the case where it is conceivable that they are apparently excluded in principle. The same goes for the numerical values and ranges described above.

Further, in the drawings used in the following embodiments, hatching is used in some cases even in a plan view so as to make the drawings easy to see. Also, the components having the same function are denoted by the same reference characters throughout the drawings for describing the embodiments, and the repetitive description thereof will be omitted. Hereinafter, typical embodiments will be described in detail based on the drawings.

(First Embodiment)

In recent years, the development of the technology to realize an optical communication module by fabricating a transmission line made of silicon (Si) and integrating various optical devices and electronic devices with using an optical circuit constituted of the transmission line as a platform, that is, the silicon photonics technology has been actively pursued.

The technology disclosed in the first embodiment is applied in particular to an optical device among various devices constituting a semiconductor device using the silicon photonics technology. For this reason, in the following description, a structure and a manufacturing method of an optical device integrated on an SOI (Silicon On Insulator) substrate will be described. In addition, in the following description, a transmission line for optical signal, a grating coupler and an optical modulator are mainly illustrated as examples of optical devices and a multilayer wiring with a two-layer structure is illustrated as an example, but the present invention is not limited to these.

<<Configuration of Semiconductor Device>>

Figure 1:
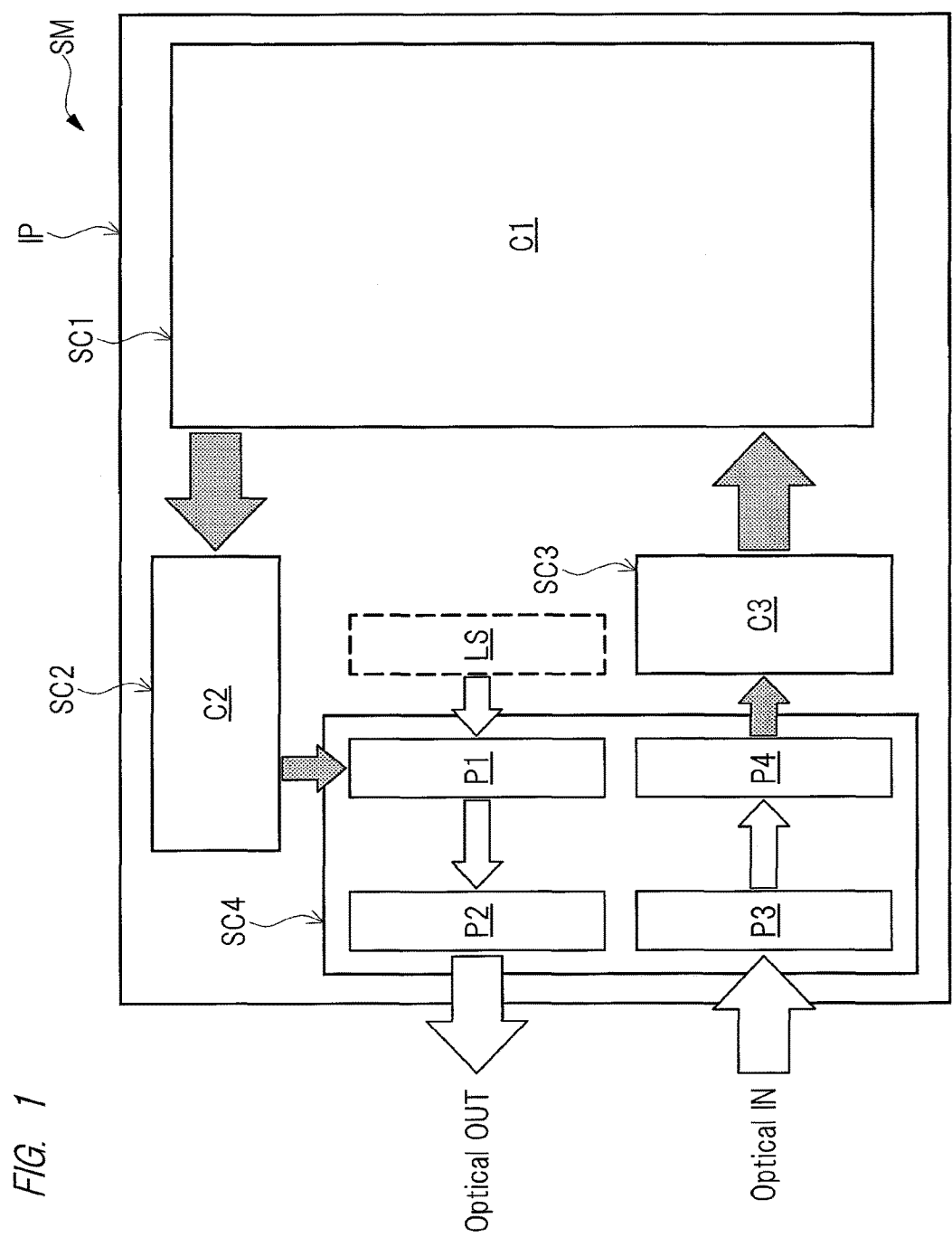

First, an example of a configuration of a semiconductor device according to the first embodiment will be simply described with reference to FIG. 1. FIG. 1 is a schematic diagram showing an example of the configuration of the semiconductor device according to the first embodiment.

As shown in FIG. 1, data output from a silicon electronic circuit C1 having a control circuit or a memory circuit formed therein is transmitted as an electric signal to an optical modulator P1 through a silicon electronic circuit (transceiver IC (Integrated Circuit)) C2. The optical modulator P1 is an optical device which converts the data transmitted as an electric signal into an optical signal. For example, continuous wave laser light is incident on the optical modulator P1 from a light source LS. By operating the phase of the light in the optical modulator P1 to change the state of the optical signal, the data transmitted as an electric signal can be made to correspond to the phase state of light.

The optical signal modulated in the optical modulator P1 is output to the outside from a semiconductor device SM through an optical coupler P2 such as a grating coupler or a spot-size converter.

On the other hand, an optical signal input to the semiconductor device SM is transmitted to an optical receiver P4 through an optical coupler P3 such as a grating coupler or a spot-size converter. The optical receiver P4 is an optical device which converts the data transmitted as an optical signal into an electric signal. Then, the data converted into an electric signal in the optical receiver P4 is transmitted to the silicon electronic circuit C1 through a silicon electronic circuit (receiver IC (Integrated Circuit)) C3.

Electric wirings mainly made of a conductive material such as aluminum (Al), copper (Cu) or tungsten (W) (indicated by hatched arrows in FIG. 1) are used for the transmission of the electric signal from the silicon electronic circuit C1 to the optical modulator P1 and the transmission of the electric signal from the optical receiver P4 to the silicon electronic circuit C1. Meanwhile, a transmission line for optical signal (hereinafter, referred to as optical signal line) made of, for example, silicon (Si) is used for the transmission of the optical signal.

In addition, the silicon electronic circuit C1, the silicon electronic circuit C2 and the silicon electronic circuit C3 are formed in semiconductor chips SC1, SC2 and SC3, respectively, and the optical modulator P1, the optical couplers P2 and P3 and the optical receiver P4 are formed in one semiconductor chip SC4. These semiconductor chips SC1, SC2, SC3 and SC4 and the light source LS are mounted on one interposer IP to form one semiconductor device SM.

Note that the case in which the electronic device and the optical device are formed in different semiconductor chips has been described here, but the present invention is not limited to this. For example, it is possible to form the electronic device and the optical device in one semiconductor chip.

<<Structure of Optical Device>>

Next, various structures of the optical waveguide will be described. There are various structures of the optical signal line, and an optical signal line whose cross section orthogonal to an optical waveguide direction has a quadrangular shape and an optical signal line whose cross section orthogonal to the optical waveguide direction has a convex shape will be illustrated as examples in the first embodiment. Further, a grating coupler, an optical modulator and a germanium optical receiver will be illustrated as examples.

<<Optical Signal Line and Grating Coupler>>

Figure 2:
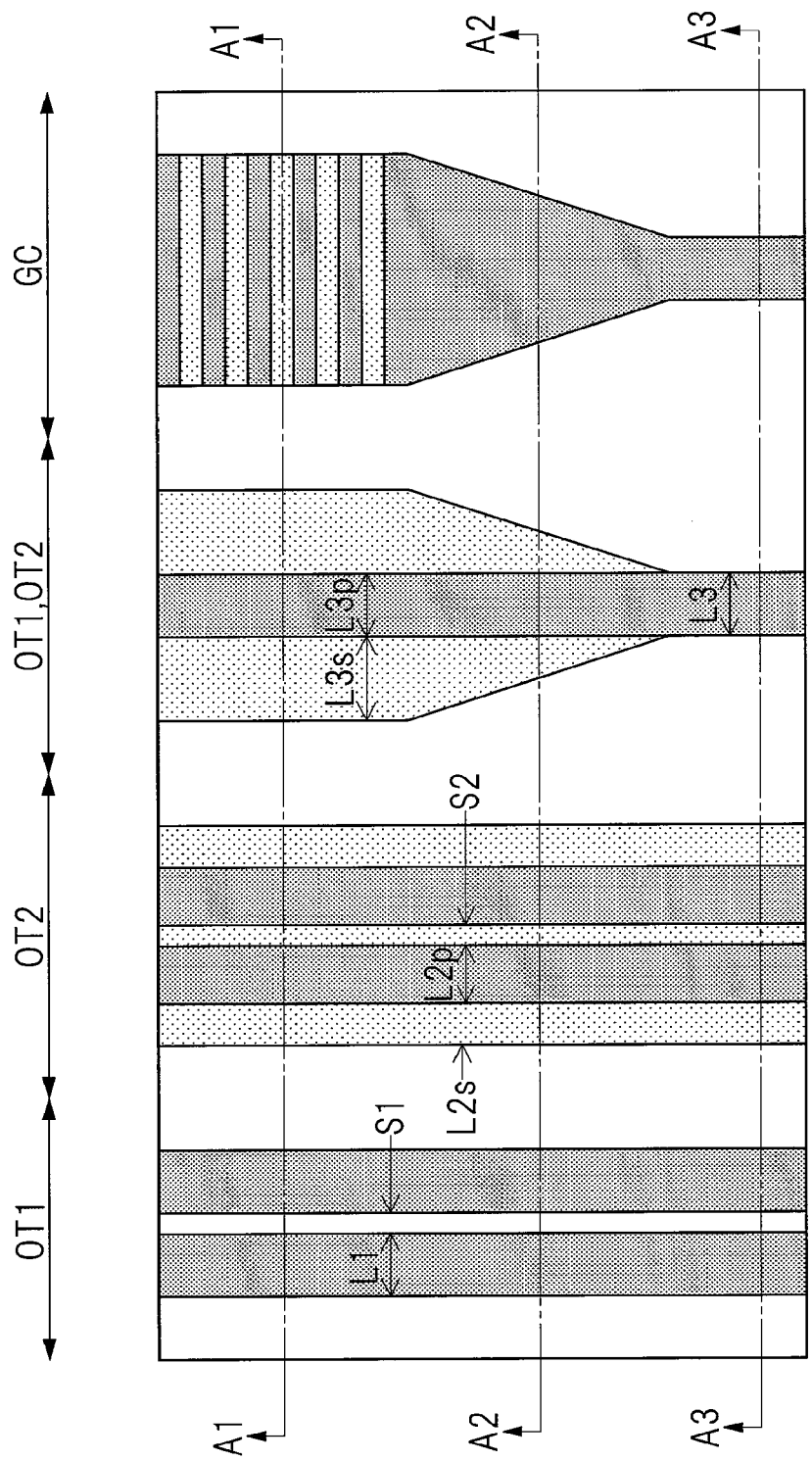

First, the optical signal line and the grating coupler will be described with reference to FIG. 2 and FIGS. 3A to 3D. FIG. 2 is a plan view showing a main part of optical signal lines and a grating coupler according to the first embodiment, in which a first optical signal line OT1 constituted of an optical waveguide whose cross section orthogonal to an optical waveguide direction has a quadrangular shape, a second optical signal line OT2 constituted of an optical waveguide whose cross section orthogonal to the optical waveguide direction has a convex shape, a converting part of the first optical signal line OT1 and the second optical signal line OT2 and a grating coupler GC, which are formed on the same substrate, are illustrated. FIG. 3A is a cross-sectional view showing a main part of the optical waveguide taken along the line A1-A1 of FIG. 2, FIG. 3B is a cross-sectional view showing a main part of the optical waveguide taken along the line A2-A2 of FIG. 2, and FIG. 3C is a cross-sectional view showing a main part of the optical waveguide taken along the line A3-A3 of FIG. 2. FIG. 3D is a cross-sectional view showing a main part of the optical waveguide taken along the line A1-A1 of FIG. 2.

As shown in FIG. 2 and FIGS. 3A to 3C, the first optical signal line OT1, the second optical signal line OT2 and the grating coupler GC are constituted of a semiconductor layer (referred to also as SOI layer) SL made of silicon (Si). This semiconductor layer SL is formed on a main surface of a semiconductor substrate SUB made of single crystal silicon (Si) with an insulating layer (referred to also as BOX layer or lower cladding layer) CL interposed therebetween. The thickness of the insulating layer CL is, for example, about 2 to 3 μm and is relatively thickly formed, and thus the light propagating through the optical waveguide does not leak out to the semiconductor substrate SUB.

The cross section of the first optical waveguide OT1 orthogonal to the optical waveguide direction has a quadrangular shape. A height (H1) of the first optical signal line OT1 is, for example, about 100 to 400 nm, and a height of 220 nm can be shown as a typical value. A width (L1) of the first optical signal OT1 in the cross section orthogonal to the optical waveguide direction is, for example, about 100 to 500 nm, and a width of 440 nm can be shown as a typical value. When a plurality of the first optical signal lines OT1 (two first optical signal lines OT1 are shown in FIG. 2 and FIGS. 3A to 3C) are formed in parallel, the shortest interval (S1) between the first optical signal lines OT1 adjacent in the cross section orthogonal to the optical waveguide direction is, for example, about 100 to 200 nm.

The semiconductor layer SL constituting the second optical signal line OT2 has a rib structure. The cross section of the second optical signal line OT2 orthogonal to the optical waveguide direction has a convex shape, and the second optical signal line OT2 has a projecting portion. Namely, the second optical signal line OT2 is constituted of a projecting portion (first plate portion) which is made of the semiconductor layer SL with a first thickness extending in the optical waveguide direction and slab portions (second plate portions) which are formed integrally with the projecting portion and made of the semiconductor layer SL disposed on both sides of the projecting portion and having a second thickness smaller than the first thickness.

A height of the projecting portion is the same as the height (H1) of the first optical signal line OT1, and a height (H2$p$) of a protruding portion of the projecting portion is, for example, about 50 to 200 nm. A width (L2$p$) of the projecting portion in the cross section orthogonal to the optical waveguide direction is, for example, about 100 to 500 nm, and a width of 440 nm can be shown as a typical value. A width (L2$s$) of the slab portion from an end of the second optical signal line OT2 to a boundary between the slab portion and the projecting portion in the cross section orthogonal to the optical waveguide direction continuously changes and is, for example, about 100 to 10000 nm, and a width of 500 nm can be shown as a typical value. When a plurality of the second optical signal lines OT2 (two second optical signal lines OT2 are shown in FIG. 2 and FIGS. 3A to 3C) are formed in parallel, the shortest interval (S2) between the projecting portions adjacent in the cross section orthogonal to the optical waveguide direction is, for example, about 100 to 200 nm.

In the converting part of the first optical signal line OT1 and the second optical signal line OT2, a width (L3) of the first optical signal line OT1 and a width (L3$p$) of the projecting portion of the second optical signal line OT2 are the same in the cross section orthogonal to the optical waveguide direction. Meanwhile, a width (L3$s$) of the second optical signal line OT2 gradually increases from the first optical signal line OT1 toward the second optical signal line OT2, and the width (L3$s$) is, for example, about 0 to 10000 nm.

The semiconductor layer SL constituting the grating coupler GC has a rib structure. The cross section of the grating coupler GC in the optical waveguide direction has a convex shape, and the grating coupler has a plurality of projecting portions separated from each other in the optical waveguide direction. Namely, the grating coupler GC is constituted of projecting portions (first plate portions) which are made of a plurality of semiconductor layers SL separated from each other in the optical waveguide direction and having the first thickness and slab portions (second plate portions) which are formed integrally with the projecting portions and made of the semiconductor layers SL disposed on both sides of the projecting portions (between adjacent projecting portions) and having the second thickness smaller than the first thickness.

The grating coupler GC is an element which couples the laser light incident from outside to the light propagating through the optical waveguide and emits the light propagating through the optical waveguide to the outside. The light propagating through the grating coupler GC is diffracted and radiated in a predetermined direction by the periodic refractive index modulation (formed by asperities on the surface) provided along the propagating direction on the optical waveguide surface.

A height of the projecting portion of the grating coupler GC is the same as the height (H1) of the first optical signal line OT1 in many cases. In addition, a height of the protruding portion of the projecting portion of the grating coupler GC is the same as the height (H2$p$) of the protruding portion of the projecting portion of the second optical signal line OT2 in many cases.

Furthermore, as shown in FIG. 3D, the first optical signal line OT1, the second optical signal line OT2 and the grating coupler GC are covered with a first interlayer insulating film (referred to also as upper cladding layer) ID1, a second interlayer insulating film ID2 and a protection film TC. The first interlayer insulating film ID1 and the second interlayer insulating film ID2 are made of, for example, silicon oxide ($SiO_2$). The protection film TC is made of, for example, silicon oxide ($SiO_2$), silicon oxynitride (SiON), PSG (Phospho Silicate Glass) or silicon nitride ($Si_3N_4$). A first layer wiring M1 and a second layer wiring M2 described later are not formed above the first optical signal line OT1, the second optical signal line OT2 and the grating coupler GC in some cases. In addition, the protection film TC is not formed above the grating coupler GC which inputs and outputs an optical signal from and to the outside in some cases.

The optical waveguide of the first embodiment is characterized in that an insulating film IF1 different from the first interlayer insulating film ID1 is formed on each of upper surfaces of the slab portions and on an outer side of side surfaces of the protruding portion of the projecting portion in the second optical signal line OT2 and the grating coupler GC. The insulating film IF1 is made of, for example, silicon oxide ($SiO_2$) and an upper surface of the insulating film IF1 and an upper surface of the projecting portion are almost flush with each other. The insulating film IF1 is not limited to silicon oxide ($SiO_2$). However, when a different material is used, another material having a refractive index different from that of the insulating layer CL and the first interlayer insulating film ID1 is to be formed, and this may cause the loss in optical characteristics.

<Optical Modulator>

Figure 4:
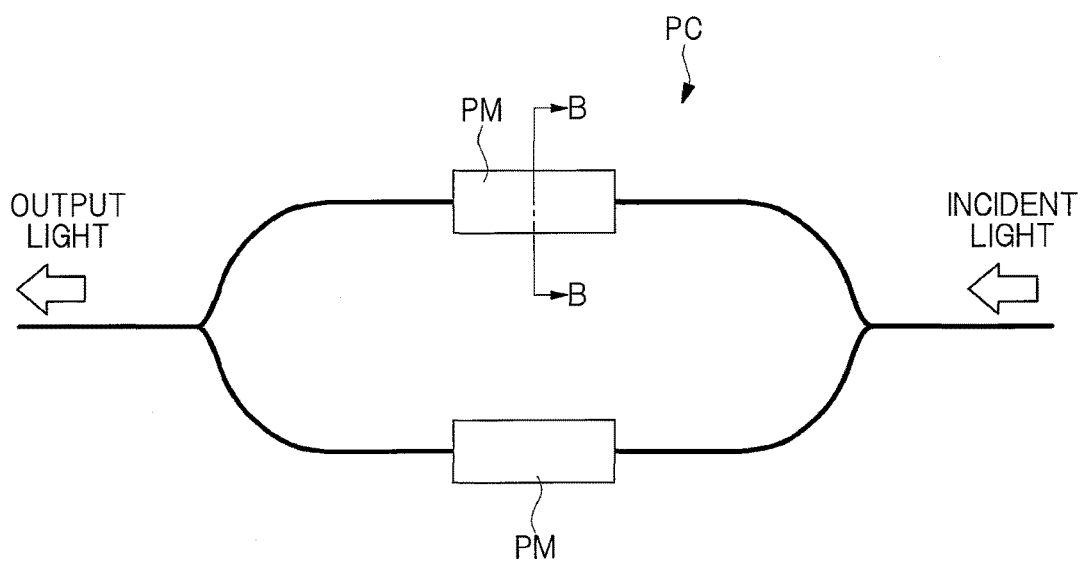
FIG. 4 is a schematic diagram showing an optical modulator according to the first embodiment.

Next, the optical modulator will be described with reference to FIG. 4 and FIG. 5. FIG. 4 is a schematic diagram showing the optical modulator according to the first embodiment. FIG. 5 is a cross-sectional view showing a main part of the optical device according to the first embodiment, in which main parts of the second optical signal line constituted of an optical waveguide whose cross section orthogonal to the optical waveguide direction has a convex shape, the grating coupler, a phase modulating part of the optical modulator and a germanium optical receiver are illustrated. The phase modulating part of the optical modulator shown in FIG. 5 corresponds to the cross section taken along the line B-B of FIG. 4.

As shown in FIG. 5, the optical modulator PC which changes an electric signal into an optical signal is constituted of the semiconductor layer SL. Here, the optical modulator PC with a pin structure will be described by way of example, but the present invention is not limited to this.

The semiconductor layer SL constituting the optical modulator PC has a rib structure. The cross section of the optical modulator PC orthogonal to the optical waveguide direction has a convex shape, and the optical modulator PC has a projecting portion. Namely, the optical modulator PC is constituted of, like the second optical signal line OT2, a projecting portion (first plate portion) which is made of the semiconductor layer SL with a first thickness extending in the optical waveguide direction and slab portions (second plate portions) which are formed integrally with the projecting portion and made of the semiconductor layer SL disposed on both sides of the projecting portion and having a second thickness smaller than the first thickness. In addition, the projecting portion serves as a core layer OW through which light propagates. The core layer OW is made of intrinsic semiconductor, that is, i-type (intrinsic type) semiconductor.

In the phase modulating part PM, a p type semiconductor PR is formed by introducing a p type impurity into the semiconductor layer SL constituting the slab portion on one side (right side in FIG. 5) of the core layer OW. This p type semiconductor PR is formed to be parallel with the core layer OW. Further, an n type semiconductor NR is formed by introducing an n type impurity into the semiconductor layer SL constituting the slab portion on the other side (left side in FIG. 5) of the core layer OW. This n type semiconductor NR is formed to be parallel with the core layer OW. Namely, the semiconductor layer SL between the p type semiconductor PR and the n type semiconductor NR serves as the core layer OW made of intrinsic semiconductor, and thus the pin structure is formed.

A height of the projecting portion constituting the core layer OW is the same as that of the first optical signal line OT1 and the second optical signal line OT2 and a height of the protruding portion of the projecting portion constituting the core layer OW is the same as that of the protruding portion of the projecting portion of the second optical signal line OT2.

The light (for example, continuous wave laser) incident from an input part is divided to two optical waveguides at a branching part and phases thereof are operated in respective phase modulating parts PM. In the phase modulating part PM, the carrier density in the core layer OW made of intrinsic semiconductor changes by applying a voltage to each of the p type semiconductor PR and the n type semiconductor NR, and the refractive index in this region changes. Consequently, the actual refractive index to the light propagating through the optical modulator PC changes, so that the phase of the light output from the optical modulator PC can be changed.

The optical modulator PC is covered with the first interlayer insulating film ID1. The first interlayer insulating film ID1 is made of, for example, silicon oxide ($SiO_2$) and the thickness thereof is, for example, about 2 to 3 µm.

The first layer wiring M1 is formed on the first interlayer insulating film ID1. The first layer wiring M1 is constituted of a main conductive material made of, for example, aluminum (Al), copper (Cu) or aluminum-copper (Al—Cu) alloy and barrier metal formed on a lower surface and an upper surface of the main conductive material. The barrier metal is provided for preventing the diffusion of the metal of the main conductive material constituting the first layer wiring M1 and is made of, for example, tantalum (Ta), titanium (Ti), tantalum nitride (TaN) or titanium nitride (TiN). The thickness thereof is, for example, about 5 to 20 nm.

The optical waveguide of the first embodiment is characterized in that the insulating film IF1 different from the first interlayer insulating film ID1 is formed on each of upper surfaces of the slab portions and on an outer side of side surfaces of the protruding portion of the projecting portion in the optical modulator PC. The insulating film IF1 is made of, for example, silicon oxide ($SiO_2$) and an upper surface of the insulating film IF1 and an upper surface of the projecting portion are almost flush with each other. The insulating film IF1 is not limited to silicon oxide ($SiO_2$). However, when a different material is used, another material having a refractive index different from that of the insulating layer CL and the first interlayer insulating film ID1 is to be formed, and this may cause the loss in optical characteristics.

Further, first connection holes (referred to also as contact holes) CT1 reaching the p type semiconductor PR and the n type semiconductor NR are formed in the first interlayer insulating film ID1 and the insulating film IF1. In the first connection hole CT1, a first plug (referred to also as buried electrode or buried contact) PL1 made of tungsten (W) as a main conductive material is formed together with barrier metal. The barrier metal is provided for preventing the diffusion of the metal of the main conductive material constituting the first plug PL1 and is made of, for example, titanium (Ti) or titanium nitride (TiN). The thickness thereof is, for example, about 5 to 20 nm. Through the first plug PL1, the p type semiconductor PR is electrically connected to the first layer wiring M1 and the n type semiconductor NR is electrically connected to the first layer wiring M1.

The first layer wiring M1 is covered with the second interlayer insulting film ID2. The second interlayer insulating film ID2 is made of, for example, silicon oxide ($SiO_2$) and the thickness thereof is, for example, 1 µm or more.

The second layer wiring M2 is formed on the second interlayer insulating film ID2. The second layer wiring M2 is constituted of, like the first layer wiring M1 described above, a main conductive material made of, for example, aluminum (Al), copper (Cu) or aluminum-copper (Al—Cu) alloy and barrier metal formed on a lower surface and an upper surface of the main conductive material. The barrier metal is provided for preventing the diffusion of the metal of the main conductive material constituting the second layer wiring M2 and is made of, for example, tantalum (Ta), titanium (Ti), tantalum nitride (TaN) or titanium nitride (TiN). The thickness thereof is, for example, about 5 to 20 nm.

Second connection holes (referred to also as via holes) CT2 reaching the first layer wirings M1 are formed in the second interlayer insulating film ID2. In the second connection hole CT2, a second plug (referred to also as buried electrode or buried contact) PL2 made of tungsten (W) as a main conductive material is formed together with barrier metal. Like the barrier metal of the first plug PL1 described above, the barrier metal is provided for preventing the diffusion of the metal of the main conductive material constituting the second plug PL2 and is made of, for example, titanium (Ti) or titanium nitride (TiN). The thickness thereof is, for example, about 5 to 20 nm. The first layer wiring M1 is electrically connected to the second layer wiring M2 through the second plug PL2.

The second layer wiring M2 is covered with the protection film TC and an upper surface of the second layer wiring M2 is exposed by forming an opening in a part of the protection film TC.

<Germanium Optical Receiver>

Next, the germanium optical receiver will be described with reference to FIG. 5. Since germanium (Ge) and silicon (Si) have high affinity for each other, the germanium optical receiver can be monolithically formed on the semiconductor layer SL made of silicon (Si).

As shown in FIG. 5, for example, the germanium optical receiver PD has a vertical-type pin structure, and is constituted of a p type layer PS obtained by introducing a p type impurity into the semiconductor layer SL, a germanium layer GE formed on the p type layer PS and an n type layer NS formed on the germanium layer GE. The n type layer NS is made of, for example, silicon germanium (SiGe) and an n type impurity is introduced thereto.

The p type layer PS is covered with the first interlayer insulating film ID1 and is electrically connected to the first layer wiring M1 through the first plug PL1 embedded in the first connection hole CT1 formed in the first interlayer insulating film ID1. Similarly, the n type layer NS is covered with the first interlayer insulating film ID1 and is electrically connected to the first layer wiring M1 through the first plug PL1 embedded in the first connection hole CT1 formed in the first interlayer insulating film ID1.

<<Manufacturing Method of Optical Device>>

A manufacturing method of an optical device according to the first embodiment will be described in order of process with reference to FIG. 6 to FIG. 12. FIG. 6 to FIG. 12 are cross-sectional views each showing a main part of an optical device in the manufacturing process according to the first embodiment. A region A indicates the first optical signal line (optical waveguide whose cross section orthogonal to the optical waveguide direction has a quadrangular shape), a region B indicates the second optical signal line (optical waveguide whose cross section orthogonal to the optical waveguide direction has a convex shape), a region C indicates the phase modulating part of the optical modulator and a region D indicates the grating coupler. The cross section orthogonal to the optical waveguide direction is shown for each of the region A, the region B and the region C, and the cross section in the optical waveguide direction is shown for the region D.

In the manufacturing method of a semiconductor device according to the first embodiment, the first optical signal line OT1, the second optical signal line OT2, the optical modulator PC and the grating coupler GC are formed. The full etching and the half etching are used for the processing of the semiconductor layer SL. The full etching means that the semiconductor layer SL is dry-etched from the upper surface to the lower surface through the whole thickness thereof, and the half etching means that the semiconductor layer SL is dry-etched from the upper surface while leaving a predetermined thickness thereof.

First, as shown in FIG. 6, an SOI substrate (substrate with an approximately circular planar shape referred to as SOI wafer in this stage) including the semiconductor substrate SUB, the insulating layer CL formed on the main surface of the semiconductor substrate SUB and the semiconductor layer SL formed on the insulating layer CL is prepared.

The semiconductor substrate SUB is a support substrate made of single crystal silicon (Si), the insulating layer CL is made of silicon oxide ($SiO_2$) and the semiconductor layer SL is made of silicon (Si). The thickness of the semiconductor substrate SUB is, for example, about 750 μm. The thickness of the insulating layer CL is, for example, about 2 to 3 μm. The thickness of the semiconductor layer SL is, for example, about 100 to 400 nm and it is set to 220 nm by way of example in this case.

Next, a first resist mask RM1 for processing the semiconductor layer SL is formed. The first resist mask RM1 is formed by, for example, applying photoresist on the semiconductor layer SL and then patterning the photoresist by performing the immersion exposure using the ArF excimer laser (wavelength: 193 nm) and the development thereto.

In this case, the first resist mask RM1 is formed so as to expose the semiconductor layer SL to be the slab portion of the optical waveguide of the second optical signal line OT2 in the region B, expose the semiconductor layer SL to be the slab portion of the optical waveguide of the optical modulator PC in the region C and expose the semiconductor layer SL to be the slab portion of the optical waveguide of the grating coupler GC in the region D. Namely, the first resist mask RM1, which determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D, is formed. Note that, when the processing depth by the half etching is different in the regions B and C and the region D, processes may be separately performed for the respective depths.

Next, as shown in FIG. 7, the semiconductor layer SL is processed by half etching with using the first resist mask RM1 as an etching mask. Thus, a plurality of trenches are formed in the semiconductor layer SL. The depth of the trench is, for example, about 70 nm. The trench determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D. In addition, the thickness of the semiconductor layer SL left under the trench corresponds to the thickness of the slab portion of each optical waveguide.

Further, the semiconductor layer SL to be the projecting portion of the optical waveguide of the second optical signal line OT2 is formed in the region B, the semiconductor layer SL to be the projecting portion of the optical waveguide of the optical modulator PC is formed in the region C, and the semiconductor layer SL to be the projecting portion of the optical waveguide of the grating coupler GC is formed in the region D.

As the etching gas for the half etching, for example, chlorine-based ($Cl_2$-based) gas, hydrogen bromide-based (HBr-based) gas, carbon tetrafluoride-based ($CF_4$-based) gas or sulfur hexafluoride-based ($SF_6$-based) gas is used. After the half etching, the first resist mask RM1 is removed by oxygen ($O_2$) plasma ashing and then the RCA clean is performed. Thereafter, a natural oxide film and others formed on the surface of the semiconductor layer SL are removed by the wet etching.

Next, as shown in FIG. 8, the insulating film IF1 is formed on the semiconductor layer SL by, for example, the SA-CVD (Sub-Atmospheric Chemical Vapor Deposition) so as to fill each of the plurality of trenches formed in the semiconductor layer SL. The insulating film IF1 determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D.

The insulating film IF1 is made of, for example, silicon oxide ($SiO_2$) and the thickness thereof is, for example, about 140 nm. Note that the insulating film IF1 is not limited to silicon oxide ($SiO_2$), and any insulating film can be used as long as it can have etching selectivity with respect to silicon (Si) constituting the semiconductor layer SL. As described above, however, if the refractive index is taken into consideration, silicon oxide ($SiO_2$) is preferable.

Next, the upper surface of the insulating film IF1 is ground by, for example, the CMP (Chemical Mechanical Polishing), thereby filing each of the plurality of trenches formed in the semiconductor layer SL with the insulating film IF1.

Next, as shown in FIG. 9, a second resist mask RM2 for processing the semiconductor layer SL is formed. The second resist mask RM2 is formed by, for example, applying photoresist on the semiconductor layer SL and then patterning the photoresist by performing the immersion exposure using the ArF excimer laser (wavelength: 193 nm) and the development thereto.

Here, the second resist mask RM2 is formed in the region A so as to cover the semiconductor layer SL to be the optical waveguide of the first optical signal line OT1. Also, the second resist mask RM2 is formed in consideration of the alignment error in the region B so that the semiconductor layer SL to be the optical waveguide of the second optical signal line OT2 is covered and pattern ends of the second resist mask RM2 are certainly located on the insulating films IF1. In addition, the second resist mask RM2 is formed in consideration of the alignment error in the region C so that the semiconductor layer SL to be the optical waveguide of the optical modulator PC is covered and pattern ends of the second resist mask RM2 are certainly located on the insulating films IF1. Further, the second resist mask RM2 is formed in consideration of the alignment error in the region D so that the semiconductor layer SL to be the optical waveguide of the grating coupler GC is covered and pattern ends of the second resist mask RM2 are located on the semiconductor layer SL having the thickness in the formation of both ends of the grating coupler GC in the optical waveguide direction.

Next, as shown in FIG. 10, the semiconductor layer SL is processed by full etching with using the second resist mask RM2 and the insulating film IF1 as an etching mask. Thus, the semiconductor layer SL which constitutes the optical waveguide of the first optical signal line OT1 and whose cross section orthogonal to the optical waveguide direction has a quadrangular shape is formed in the region A, the semiconductor layer SL which constitutes the optical waveguide of the second optical signal line OT2 and whose cross section orthogonal to the optical waveguide direction has a convex shape is formed in the region B, and the semiconductor layer SL which constitutes the optical waveguide of the optical modulator PC and whose cross section orthogonal to the optical waveguide direction has a convex shape is formed in the region C. Further, the semiconductor layer SL which constitutes the optical waveguide of the grating coupler GC and whose cross section in the optical waveguide direction has a convex shape is formed in the region D.

Here, in the optical waveguide of the second optical signal line OT2 formed in the region B and the optical waveguide of the optical modulator PC formed in the region C, the width of the projecting portion and the width of the slab portion in the direction orthogonal to the optical waveguide direction are already determined by the insulating film IF1. Therefore, the symmetry of the optical waveguide can be ensured even when the alignment error of the second resist mask RM2 occurs.

Hence, according to the first embodiment, it is not necessary to consider the alignment error when forming the optical waveguide with a rib structure, and the dimensional error in the half etching (for example, about 1 nm) and the dimensional error in the full etching (for example, about 1 nm) mainly affect the symmetry of the optical waveguide with the rib structure. Since the alignment error is about 10 nm in general, the symmetry of the optical waveguide with a rib structure can be significantly improved.

In addition, since the trenches formed by the half etching are filled with the insulating film IF1 and the upper surfaces of the semiconductor layer SL and the insulating film IF1 are flat, it is possible to easily form the second resist mask RM2 with the desired thickness and dimensions. Thus, it is possible to form the optical waveguide with a rib structure with good reproducibility.

Next, as shown in FIG. 11, in the phase modulating part PM of the optical modulator PC, a p type impurity is introduced by, for example, the ion implantation to the semiconductor layer SL constituting the slab portion on one side of the projecting portion, thereby forming the p type semiconductor PR. Similarly, an n type impurity is introduced by, for example, the ion implantation to the semiconductor layer SL constituting the slab portion on the other side of the projecting portion, thereby forming the n type semiconductor NR. The semiconductor layer SL formed of a projecting portion between the p type semiconductor PR and the n type semiconductor NR serves as the core layer OW made of intrinsic semiconductor.

Next, the first interlayer insulating film ID1 is formed so as to cover the first optical signal line OT1, the second optical signal line OT2, the optical modulator PC and the grating coupler GC. The first interlayer insulating film ID1 is made of silicon oxide ($SiO_2$) formed by, for example, the plasma CVD (Chemical Vapor Deposition), and the thickness thereof is, for example, about 2 to 3 μm. Subsequently, the upper surface of the first interlayer insulating film ID1 is planarized by, for example, the CMP.

Next, as shown in FIG. 12, after the first connection holes CT1 which reach the p type semiconductor PR and the n type semiconductor NR of the optical modulator PC are formed in the first interlayer insulating film ID1, a conductive film is formed to fill the first connection holes CT1, thereby forming the first plugs PL1 made of the conductive film embedded therein. The first plug PL1 is made of, for example, aluminum (Al) or tungsten (W).

Next, after a metal film, for example, an aluminum (Al) film is deposited on the first interlayer insulating film ID1 by the sputtering or the like, the metal film is processed by dry etching using a resist mask, thereby forming the first layer wiring M1.

Next, the second interlayer insulating film ID2 is formed so as to cover the first layer wiring M1 in the same manner as the first interlayer insulating film ID1. The second interlayer insulating film ID2 is made of silicon oxide ($SiO_2$) formed by, for example, plasma CVD, and the thickness thereof is, for example, 1 μm or more. Subsequently, the upper surface of the second interlayer insulating film ID2 is planarized by, for example, the CMP.

Next, after the connection holes CT2 which reach the first layer wirings M1 are formed in the second interlayer insulating film ID2, a conductive film is formed to fill the second connection holes CT2, thereby forming the second plugs PL2 made of the conductive film embedded therein. The second plug PL2 is made of, for example, aluminum (Al) or tungsten (W).

Next, after a metal film, for example, an aluminum (Al) film is deposited on the second interlayer insulating film ID2 by the sputtering or the like, the metal film is processed by dry etching using a resist mask, thereby forming the second layer wiring M2.

Thereafter, the protection film TC is formed so as to cover the second layer wiring M2. The protection film TC is made of, for example, silicon oxynitride (SiCN). Then, the protection film TC is processed to expose the upper surface of the second layer wiring M2. Herewith, the semiconductor device according to the first embodiment is almost completed.

As described above, according to the first embodiment, the silicon optical waveguide with a highly symmetric rib structure can be formed, and thus the optical device with low propagation loss can be obtained.

(Second Embodiment)
<<Structure of Optical Device>>

An optical device according to the second embodiment will be described with reference to FIG. 13. FIG. 13 is a cross-sectional view showing a main part of the optical device according to the second embodiment, in which main parts of a first optical signal line constituted of an optical waveguide whose cross section orthogonal to an optical waveguide direction has a quadrangular shape, a second optical signal line constituted of an optical waveguide whose cross section orthogonal to the optical waveguide direction has a convex shape, a phase modulating part of an optical modulator, a grating coupler and a germanium optical receiver are illustrated.

The difference from the first embodiment described above is that an insulating film IF2 is formed on each of the upper surfaces of the optical waveguide constituting the first optical signal line OT1 and the projecting portions of the optical waveguides with a rib structure constituting the second optical signal line OT2, the optical modulator PC and the grating coupler GC. The insulating film IF2 is made of, for example, silicon nitride ($Si_3N_4$) or silicon oxide ($SiO_2$). The formation of the insulating film IF2 can prevent the surface roughness of the semiconductor layer SL caused in a manufacturing method of an optical device described later.

<<Manufacturing Method of Optical Device>>

A manufacturing method of an optical device according to the second embodiment will be described in order of process with reference to FIG. 14 to FIG. 19. FIG. 14 to FIG. 19 are cross-sectional views each showing a main part of an optical device in the manufacturing process according to the second embodiment. A region A indicates the first optical signal line (optical waveguide whose cross section orthogonal to the optical waveguide direction has a quadrangular shape), a region B indicates the second optical signal line (optical waveguide whose cross section orthogonal to the optical waveguide direction has a convex shape), a region C indicates the phase modulating part of the optical modulator and a region D indicates the grating coupler. The cross section orthogonal to the optical waveguide direction is shown for each of the region A, the region B and the region C, and the cross section in the optical waveguide direction is shown for the region D.

First, as shown in FIG. 14, the SOI substrate similar to that of the first embodiment described above is prepared. Next, the insulating film IF2 is formed on the semiconductor layer SL. The insulating film IF2 is made of, for example, silicon nitride ($Si_3N_4$) or silicon oxide ($SiO_2$), and the thickness thereof is, for example, about 2 to 10 nm.

Next, the first resist mask RM1 for processing the insulating film IF2 is formed. The first resist mask RM1 is formed by, for example, applying photoresist on the insulating film IF2 and then patterning the photoresist by performing the immersion exposure using the ArF excimer laser (wavelength: 193 nm) and the development thereto.

Next, as shown in FIG. 15, the insulating film IF2 is etched with using the first resist mask RM1 as an etching mask. Thus, a hard mask HM made of the insulating film IF2 is formed so as to expose the semiconductor layer SL to be the slab portion of the optical waveguide of the second optical signal line OT2 in the region B, expose the semiconductor layer SL to be the slab portion of the optical waveguide of the optical modulator PC in the region C and expose the semiconductor layer SL to be the slab portion of the optical waveguide of the grating coupler GC in the region D. Namely, the hard mask HM, which determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D, is formed.

Thereafter, the first resist mask RM1 is removed by oxygen ($O_2$) plasma ashing and then the RCA clean is performed.

Next, the semiconductor layer SL is processed by half etching with using the hard mask HM as an etching mask. Thus, a plurality of trenches are formed in the semiconductor layer SL. The depth of the trench is, for example, about 70 nm. The trench determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D. In addition, the thickness of the semiconductor layer SL left under the trench corresponds to the thickness of the slab portion of each optical waveguide.

Further, the semiconductor layer SL to be the projecting portion of the optical waveguide of the second optical signal line OT2 is formed in the region B, the semiconductor layer SL to be the projecting portion of the optical waveguide of the optical modulator PC is formed in the region C, and the semiconductor layer SL to be the projecting portion of the optical waveguide of the grating coupler GC is formed in the region D.

As the etching gas for the half etching, for example, chlorine-based ($Cl_2$-based) gas, hydrogen bromide-based (HBr-based) gas, carbon tetrafluoride-based ($CF_4$-based) gas or sulfur hexafluoride-based ($SF_6$-based) gas is used.

Next, as shown in FIG. 16, the insulating film IF1 is formed on the semiconductor layer SL by, for example, the SA-CVD so as to fill each of the plurality of trenches formed in the semiconductor layer SL. The insulating film IF1 determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D.

The insulating film IF1 is made of, for example, silicon oxide ($SiO_2$) and the thickness thereof is, for example, about 140 nm. Note that the insulating film IF1 is not limited to silicon oxide ($SiO_2$), and any insulating film can be used as long as it can have etching selectivity with respect to silicon (Si) constituting the semiconductor layer SL. As described above, however, if the refractive index is taken into consideration, silicon oxide ($SiO_2$) is preferable.

Next, the upper surface of the insulating film IF1 is ground by, for example, the CMP, thereby filing each of the plurality of trenches formed in the semiconductor layer SL with the insulating film IF1.

Incidentally, since the surface roughness of the semiconductor layer SL causes the propagation loss of the optical waveguide, it is desirable that the surface of the semiconductor layer SL is not ground. Therefore, in the second embodiment, the insulating film IF2 formed on the semiconductor layer SL is used as a stopper when the insulating film IF is ground. Herewith, the surface of the semiconductor layer SL is not ground, and thus the propagation loss of the optical waveguide due to the surface roughness of the semiconductor layer SL can be prevented.

Next, as shown in FIG. 17, a second resist mask RM2 for processing the semiconductor layer SL is formed. The second resist mask RM2 is formed by, for example, applying photoresist on the semiconductor layer SL and then patterning the photoresist by performing the immersion exposure using the ArF excimer laser (wavelength: 193 nm) and the development thereto.

Here, the second resist mask RM2 is formed in the region A so as to cover the semiconductor layer SL to be the optical waveguide of the first optical signal line OT1. Also, the second resist mask RM2 is formed in consideration of the alignment error in the region B so that the semiconductor layer SL to be the optical waveguide of the second optical signal line OT2 is covered and pattern ends of the second resist mask RM2 are certainly located on the insulating films IF1. In addition, the second resist mask RM2 is formed in consideration of the alignment error in the region C so that the semiconductor layer SL to be the optical waveguide of the optical modulator PC is covered and pattern ends of the second resist mask RM2 are certainly located on the insulating films IF1. Further, the second resist mask RM2 is formed in consideration of the alignment error in the region D so that the semiconductor layer SL to be the optical waveguide of the grating coupler GC is covered and pattern ends of the second resist mask RM2 are located on the semiconductor layer SL having the thickness in the formation of both ends of the grating coupler GC in the optical waveguide direction.

Next, as shown in FIG. 18, the insulating film IF2 is etched and the semiconductor layer SL is processed by full etching with using the second resist mask RM2 and the insulating film IF1 as an etching mask. Thus, the semiconductor layer SL which constitutes the optical waveguide of the first optical signal line OT1 and whose cross section orthogonal to the optical waveguide direction has a quadrangular shape is formed in the region A, the semiconductor layer SL which constitutes the optical waveguide of the second optical signal line OT2 and whose cross section orthogonal to the optical waveguide direction has a convex shape is formed in the region B, and the semiconductor layer SL which constitutes the optical waveguide of the optical modulator PC and whose cross section orthogonal to the optical waveguide direction has a convex shape is formed in the region C. Further, the semiconductor layer SL which constitutes the optical waveguide of the grating coupler GC and whose cross section in the optical waveguide direction has a convex shape is formed in the region D.

Here, in the optical waveguide of the second optical signal line OT2 formed in the region B and the optical waveguide of the optical modulator PC formed in the region C, the width of the projecting portion and the width of the slab portion in the direction orthogonal to the optical waveguide direction are already determined by the insulating film IF1. Therefore, the symmetry of the optical waveguide can be ensured even when the alignment error of the second resist mask RM2 occurs.

Hence, according to the second embodiment, it is not necessary to consider the alignment error when forming the optical waveguide with a rib structure, and the dimensional error in the half etching (for example, about 1 nm) and the dimensional error in the full etching (for example, about 1 nm) mainly affect the symmetry of the optical waveguide with the rib structure. Since the alignment error is about 10 nm in general, the symmetry of the optical waveguide with a rib structure can be significantly improved.

In addition, since the trenches formed by the half etching are filled with the insulating film IF1 and the upper surfaces of the insulating films IF1 and IF2 are flat, it is possible to easily form the second resist mask RM2 with the desired thickness and dimensions. Thus, it is possible to form the optical waveguide with a convex shape with good reproducibility.

Next, in the same manner as that of the first embodiment described above, the first layer wiring M1, the second layer wiring M2 and others are formed and then the protection film TC covering the second layer wiring M2 is formed as shown in FIG. 19. Herewith, the semiconductor device according to the second embodiment is almost completed.

As described above, according to the second embodiment, the surface roughness of the semiconductor layer SL constituting the optical waveguide can be reduced, and thus the optical device with lower propagation loss than the first embodiment described above can be obtained.

(Third Embodiment)
<<Structure of Optical Device>>
An optical device according to the third embodiment will be described with reference to FIG. 20. FIG. 20 is a cross-sectional view showing a main part of the optical device according to the third embodiment, in which main parts of a first optical signal line constituted of an optical waveguide whose cross section orthogonal to an optical waveguide direction has a quadrangular shape, a second optical signal line constituted of an optical waveguide whose cross section orthogonal to the optical waveguide direction has a convex shape, a phase modulating part of an optical modulator, a grating coupler and a germanium optical receiver are illustrated.

The difference from the first embodiment described above is that the insulating film IF1 is formed also on each of the upper surfaces of the optical waveguide constituting the first optical signal line OT1 and the projecting portions of the optical waveguides with a rib structure constituting the second optical signal line OT2, the optical modulator PC and the grating coupler GC. By forming the insulating film IF1 on each of the upper surfaces of the optical waveguide constituting the first optical signal line OT1 and the projecting portions of the optical waveguides with a rib structure constituting the second optical signal line OT2, the optical modulator PC and the grating coupler GC, it is possible to prevent the surface roughness of the semiconductor layer SL caused in a manufacturing method of an optical device described later.

<<Manufacturing Method of Optical Device>>
A manufacturing method of an optical device according to the third embodiment will be described in order of process with reference to FIG. 21 to FIG. 26. FIG. 21 to FIG. 26 are cross-sectional views each showing a main part of an optical device in the manufacturing process according to the third embodiment. A region A indicates the first optical signal line (optical waveguide whose cross section orthogonal to the optical waveguide direction has a quadrangular shape), a region B indicates the second optical signal line (optical waveguide whose cross section orthogonal to the optical waveguide direction has a convex shape), a region C indicates the phase modulating part of the optical modulator and a region D indicates the grating coupler. The cross section orthogonal to the optical waveguide direction is shown for each of the region A, the region B and the region C, and the cross section in the optical waveguide direction is shown for the region D.

First, as shown in FIG. 21, the SOI substrate similar to that of the first embodiment described above is prepared and the first resist mask RM1 for processing the semiconductor layer SL is formed. The first resist mask RM1 is formed by, for example, applying photoresist on the semiconductor layer SL and then patterning the photoresist by performing the immersion exposure using the ArF excimer laser (wavelength: 193 nm) and the development thereto.

In this case, the first resist mask RM1 is formed so as to expose the semiconductor layer SL to be the slab portion of the optical waveguide of the second optical signal line OT2 in the region B, expose the semiconductor layer SL to be the slab portion of the optical waveguide of the optical modulator PC in the region C and expose the semiconductor layer SL to be the slab portion of the optical waveguide of the grating coupler GC in the region D. Namely, the first resist mask RM1, which determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D, is formed.

Next, as shown in FIG. 22, the semiconductor layer SL is processed by half etching with using the first resist mask RM1 as an etching mask. Thus, a plurality of trenches are formed in the semiconductor layer SL. The depth of the trench is, for example, about 70 nm. The trench determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D. In addition, the thickness of the semiconductor layer SL left under the trench corresponds to the thickness of the slab portion of each optical waveguide.

Further, the semiconductor layer SL to be the projecting portion of the optical waveguide of the second optical signal line OT2 is formed in the region B, the semiconductor layer SL to be the projecting portion of the optical waveguide of the optical modulator PC is formed in the region C, and the semiconductor layer SL to be the projecting portion of the optical waveguide of the grating coupler GC is formed in the region D.

As the etching gas for the half etching, for example, chlorine-based ($Cl_2$-based) gas, hydrogen bromide-based (HBr-based) gas, carbon tetrafluoride-based ($CF_4$-based) gas or sulfur hexafluoride-based ($SF_6$-based) gas is used. After the half etching, the first resist mask RM1 is removed by oxygen ($O_2$) plasma ashing and then the RCA clean is performed. Thereafter, natural oxide film and others formed on the surface of the semiconductor layer SL are removed by the wet etching.

Next, as shown in FIG. 23, the insulating film IF1 is formed on the semiconductor layer SL by, for example, the SA-CVD so as to fill each of the plurality of trenches formed in the semiconductor layer SL. The insulating film IF1 determines the width of the projecting portion and the width of the slab portion in the direction orthogonal to the optical waveguide direction in the region B and the region C and determines the width of the projecting portion and the interval between the adjacent projecting portions (width of the slab portion) in the optical waveguide direction in the region D.

The insulating film IF1 is made of, for example, silicon oxide ($SiO_2$) and the thickness thereof is, for example, about 140 nm. Note that the insulating film IF1 is not limited to silicon oxide ($SiO_2$), and any insulating film can be used as long as it can have etching selectivity with respect to silicon (Si) constituting the semiconductor layer SL. As described above, however, if the refractive index is taken into consideration, silicon oxide ($SiO_2$) is preferable.

Next, the upper surface of the insulating film IF1 is ground by, for example, the CMP, thereby filing each of the plurality of trenches formed in the semiconductor layer SL with the insulating film IF1.

Incidentally, since the surface roughness of the semiconductor layer SL causes the propagation loss of the optical waveguide as described in the second embodiment above, it is desirable that the surface of the semiconductor layer SL is not ground. Therefore, in the third embodiment, when grinding the insulating film IF1, the insulating film IF1 is left on the upper surface of the semiconductor substrate SL without grinding it until the upper surface of the semiconductor layer SL is exposed. Consequently, the surface of the semiconductor layer SL is not ground, and thus the propagation loss of the optical waveguide due to the surface roughness of the semiconductor layer SL can be prevented. The thickness of the insulating film IF1 left on the upper surface of the semiconductor layer SL having no trench formed therein (hereinafter, referred to as protection insulating film IF1a) is, for example, about 2 to 10 nm.

Next, as shown in FIG. 24, a second resist mask RM2 for processing the semiconductor layer SL is formed. The second resist mask RM2 is formed by, for example, applying photoresist on the semiconductor layer SL and then patterning the photoresist by performing the immersion exposure using the ArF excimer laser (wavelength: 193 nm) and the development thereto.

Here, the second resist mask RM2 is formed in the region A so as to cover the semiconductor layer SL to be the optical waveguide of the first optical signal line OT1. Also, the second resist mask RM2 is formed in consideration of the alignment error in the region B so that the semiconductor layer SL to be the optical waveguide of the second optical signal line OT2 is covered and pattern ends of the second resist mask RM2 are certainly located on the insulating films IF1. In addition, the second resist mask RM2 is formed in consideration of the alignment error in the region C so that the semiconductor layer SL to be the optical waveguide of the optical modulator PC is covered and pattern ends of the second resist mask RM2 are certainly located on the insulating films IF1. Further, the second resist mask RM2 is formed in consideration of the alignment error in the region D so that the semiconductor layer SL to be the optical waveguide of the grating coupler GC is covered and pattern ends of the second resist mask RM2 are located on the semiconductor layer SL having the thickness in the formation of both ends of the grating coupler GC in the optical waveguide direction.

Next, as shown in FIG. 25, the protection insulating film IF1a is etched with using the second resist mask RM2 as an etching mask, and the semiconductor layer SL is processed by full etching with using the second resist mask RM2 and the insulating film IF1 as an etching mask. Thus, the semiconductor layer SL which constitutes the optical waveguide of the first optical signal line OT1 and whose cross section orthogonal to the optical waveguide direction has a quadrangular shape is formed in the region A, the semiconductor layer SL which constitutes the optical waveguide of the second optical signal line OT2 and whose cross section orthogonal to the optical waveguide direction has a convex shape is formed in the region B, and the semiconductor layer SL which constitutes the optical waveguide of the optical modulator PC and whose cross section orthogonal to the optical waveguide direction has a convex shape is formed in the region C. Further, the semiconductor layer SL which constitutes the optical waveguide of the grating coupler GC and whose cross section in the optical waveguide direction has a convex shape is formed in the region D.

Here, in the optical waveguide of the second optical signal line OT2 formed in the region B and the optical waveguide of the optical modulator PC formed in the region C, the width of the projecting portion and the width of the slab portion in the direction orthogonal to the optical waveguide direction are already determined by the insulating film IF1. Therefore, the symmetry of the optical waveguide can be ensured even when the alignment error of the second resist mask RM2 occurs.

Hence, according to the third embodiment, it is not necessary to consider the alignment error when forming the optical waveguide with a rib structure, and the dimensional error in the half etching (for example, about 1 nm) and the dimensional error in the full etching (for example, about 1 nm) mainly affect the symmetry of the optical waveguide with the rib structure. Since the alignment error is about 10 nm in general, the symmetry of the optical waveguide with a rib structure can be significantly improved.

In addition, since the trenches formed by the half etching are filled with the insulating film IF1 and the upper surfaces of the insulating film IF1 and the protection insulting film IF1a are flat, it is possible to easily form the second resist mask RM2 with the desired thickness and dimensions. Thus, it is possible to form the optical waveguide with a convex shape with good reproducibility.

Next, in the same manner as that of the first embodiment described above, the first layer wiring M1, the second layer wiring M2 and others are formed and then the protection film TC covering the second layer wiring M2 is formed as shown in FIG. 26. Herewith, the semiconductor device according to the third embodiment is almost completed.

As described above, according to the third embodiment, the surface roughness of the semiconductor layer SL constituting the optical waveguide can be reduced, and thus the optical device with lower propagation loss than the first embodiment described above can be obtained.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A manufacturing method of a semiconductor device having an optical waveguide constituted of a first plate portion made of a semiconductor layer extending in an optical waveguide direction and having a first thickness and second plate portions made of the semiconductor layer disposed on both sides of the first plate portion in a width direction thereof and having a second thickness smaller than the first thickness, the method comprising the steps of:
   (a) preparing a substrate constituted of a semiconductor substrate, a first insulating film on an upper surface of the semiconductor substrate and a semiconductor layer with the first thickness on an upper surface of the first insulating film;
   (b) forming a first resist mask having openings at positions of second-plate-portion regions in which the second plate portions are to be formed, on an upper surface of the semiconductor layer;
   (c) performing first etching to the semiconductor layer with using the first resist mask as an etching mask, thereby forming trenches in the second-plate-portion regions while leaving the semiconductor layer with the second thickness;
   (d) forming a second insulating film on the upper surface of the semiconductor layer including insides of the trenches and then grinding the second insulating film to fill the trenches with respective portions of the second insulating film;
   (e) forming a second resist mask which covers the semiconductor layer of a first-plate-portion region in which the first plate portion is to be formed and whose pattern ends are located on upper surfaces of the portions of the second insulating film; and
   (f) performing second etching to the semiconductor layer with using the second resist mask and the portions of the second insulating film as an etching mask, thereby forming the first plate portion with the first thickness in the first-plate-portion region and the second plate portions with the second thickness in the second-plate-portion regions.

2. The manufacturing method of a semiconductor device according to claim 1,
   wherein, in the step (d), a height from the upper surface of the first insulating film to an upper surface of the first plate portion is made the same as a height from the upper surface of the first insulating film to the upper surface of the second insulating film.

3. The manufacturing method of a semiconductor device according to claim 1,
   wherein, in the step (d), the second insulating film with a thickness of 2 to 10 nm is left on the upper surface of the semiconductor layer in the first-plate-portion region.

4. The manufacturing method of a semiconductor device according to claim 1,
   wherein the first insulating film and the second insulating film are made of silicon oxide and the semiconductor layer is made of silicon.

5. A manufacturing method of a semiconductor device having an optical waveguide constituted of a first plate portion made of a semiconductor layer extending in an optical waveguide direction and having a first thickness and second plate portions made of the semiconductor layer disposed on both sides of the first plate portion in a width direction thereof and having a second thickness smaller than the first thickness, the method comprising the steps of:
   (a) preparing a substrate constituted of a semiconductor substrate, a first insulating film on a main surface of the semiconductor substrate and a semiconductor layer with the first thickness on an upper surface of the first insulating film;
   (b) forming a second insulating film on an upper surface of the semiconductor layer;
   (c) forming a first resist mask having openings at positions of second-plate-portion regions in which the second plate portions are to be formed, on an upper surface of the second insulating film;
   (d) performing first etching to the second insulating film with using the first resist mask as an etching mask, thereby forming a hard mask made of the second insulating film having openings at positions of the second-plate-portion regions;
   (e) performing second etching to the semiconductor layer with using the hard mask as an etching mask, thereby forming trenches in the second-plate-portion regions while leaving the semiconductor layer with the second thickness;
   (f) forming a third insulating film on the upper surface of the second insulating film including insides of the trenches and then grinding the third insulating film to fill the trenches with respective portions of the third insulating film;
   (g) forming a second resist mask which covers the second insulating film in a first-plate-portion region in which the first plate portion is to be formed and whose pattern ends are located on the portions of the third insulating film; and (h) performing third etching to the second insulating film and the semiconductor layer with using the second resist mask and the portions of the third insulating film as an etching mask, thereby forming the first plate portion having the first thickness in the first-plate-portion region and forming the second plate portions having the second thickness in the second-plate-portion regions.

6. The manufacturing method of a semiconductor device according to claim 5, wherein, in the step (f), a height from the upper surface of the first insulating film to the upper surface of the second insulating film is made the same as a height from the upper surface of the first insulating film to the upper surface of the third insulating film.

7. The manufacturing method of a semiconductor device according to claim 5, wherein a thickness of the second insulating film is 2 to 10 nm.

8. The manufacturing method of a semiconductor device according to claim 5, wherein the first insulating film and the third insulating film are made of silicon oxide, the second insulating film is made of silicon nitride or silicon oxide and the semiconductor layer is made of silicon.

* * * * *